Sept. 15, 1959 G. H. TABER 2,904,343
MOTOR VEHICLE STEERING AND SPRING SUSPENSION MECHANISM
Filed April 29, 1955 10 Sheets-Sheet 1

INVENTOR
GEORGE H. TABER

ATTORNEYS

Sept. 15, 1959  G. H. TABER  2,904,343
MOTOR VEHICLE STEERING AND SPRING SUSPENSION MECHANISM
Filed April 29, 1955  10 Sheets-Sheet 2
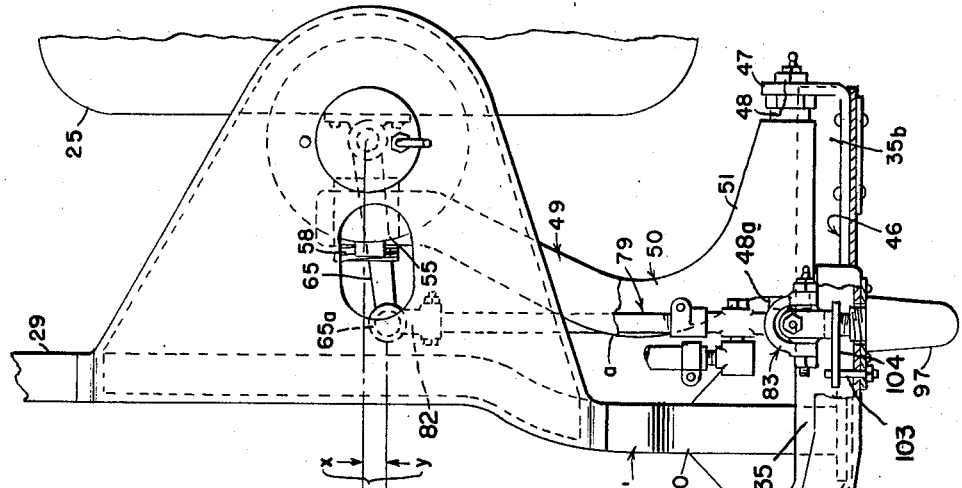
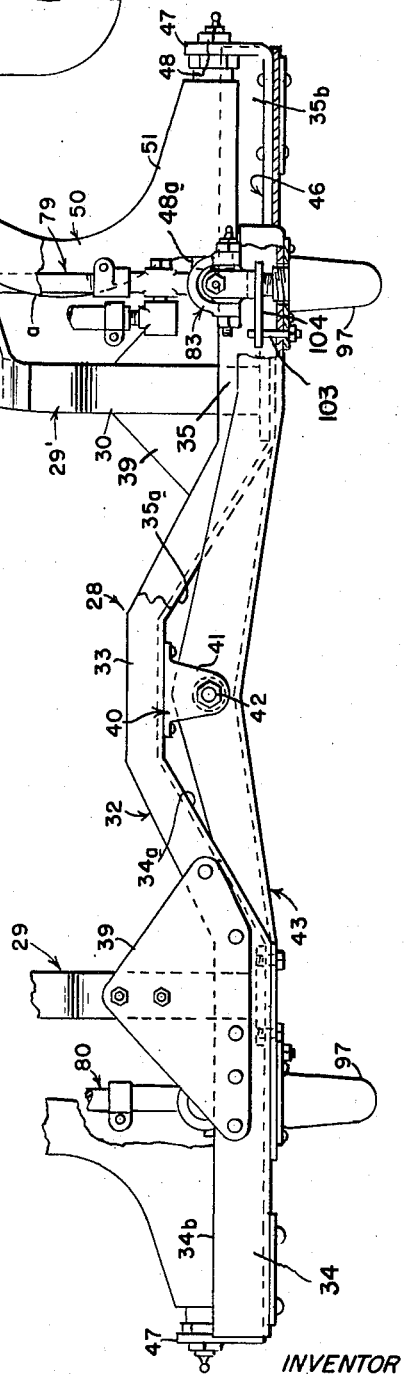
FIG. 2.
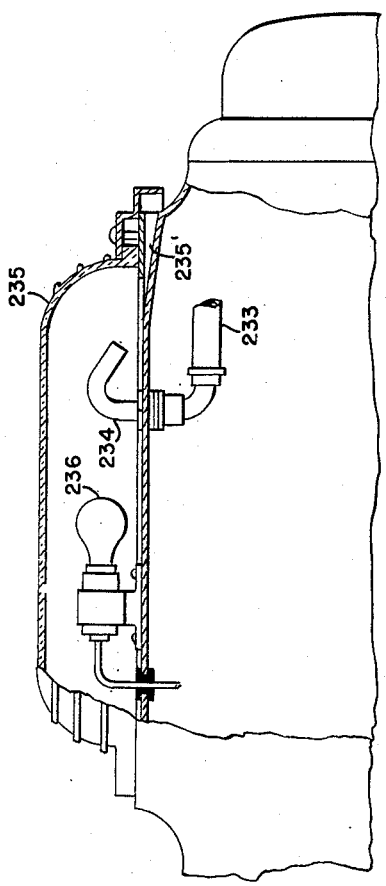
FIG. 23
INVENTOR
GEORGE H. TABER
By Shoemaker & Mattare
ATTORNEYS Sept. 15, 1959  G. H. TABER  2,904,343
MOTOR VEHICLE STEERING AND SPRING SUSPENSION MECHANISM
Filed April 29, 1955  10 Sheets-Sheet 3

INVENTOR
GEORGE H. TABER
ATTORNEYS

Sept. 15, 1959  G. H. TABER  2,904,343
MOTOR VEHICLE STEERING AND SPRING SUSPENSION MECHANISM
Filed April 29. 1955  10 Sheets-Sheet 4

INVENTOR
GEORGE H. TABER
By Shoemaker & Mattare
ATTORNEYS

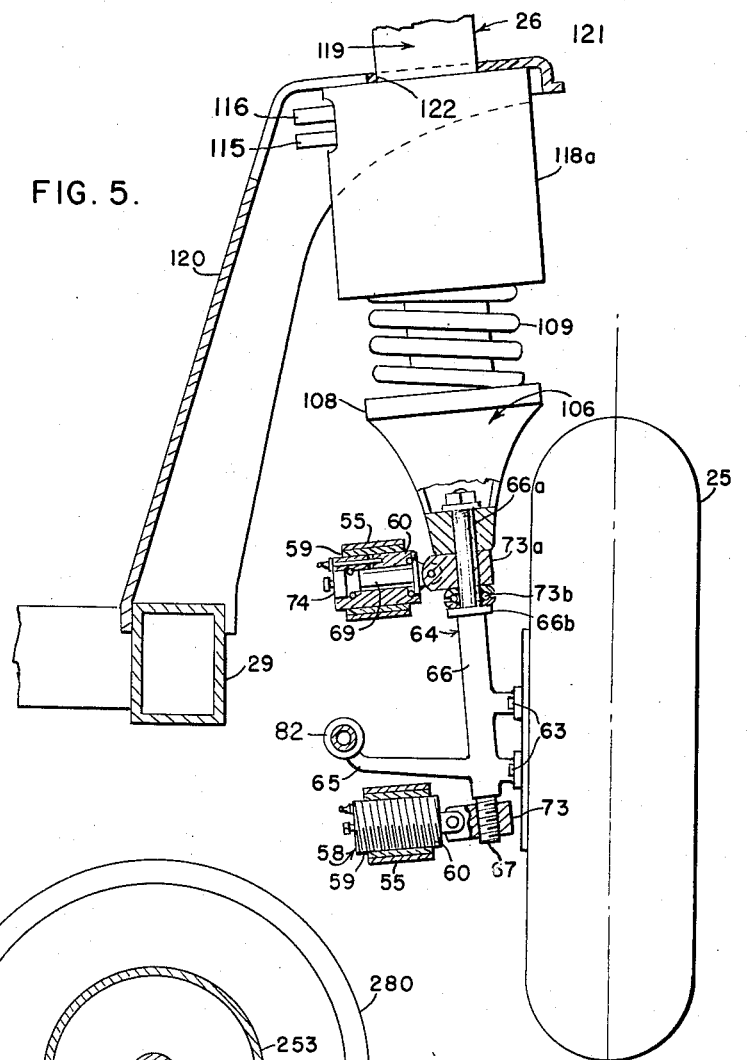
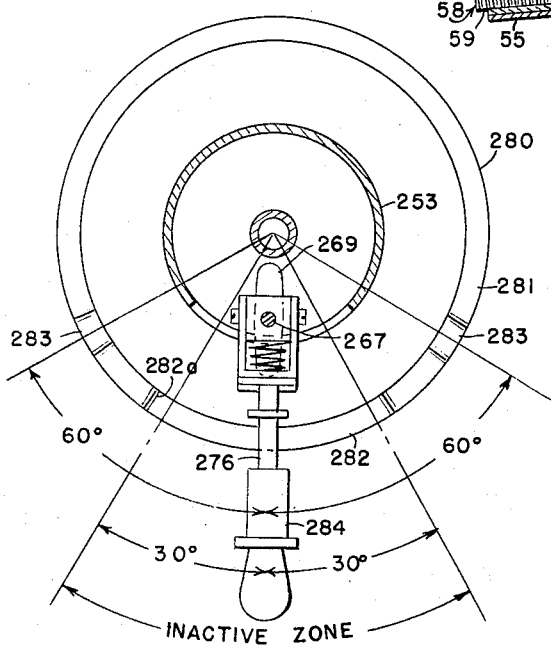
FIG. 5.
FIG. 25.

Sept. 15, 1959  G. H. TABER  2,904,343
MOTOR VEHICLE STEERING AND SPRING SUSPENSION MECHANISM
Filed April 29, 1955  10 Sheets-Sheet 6

*INVENTOR*
GEORGE H. TABER
BY Shoemaker & Mattare
*ATTORNEYS*

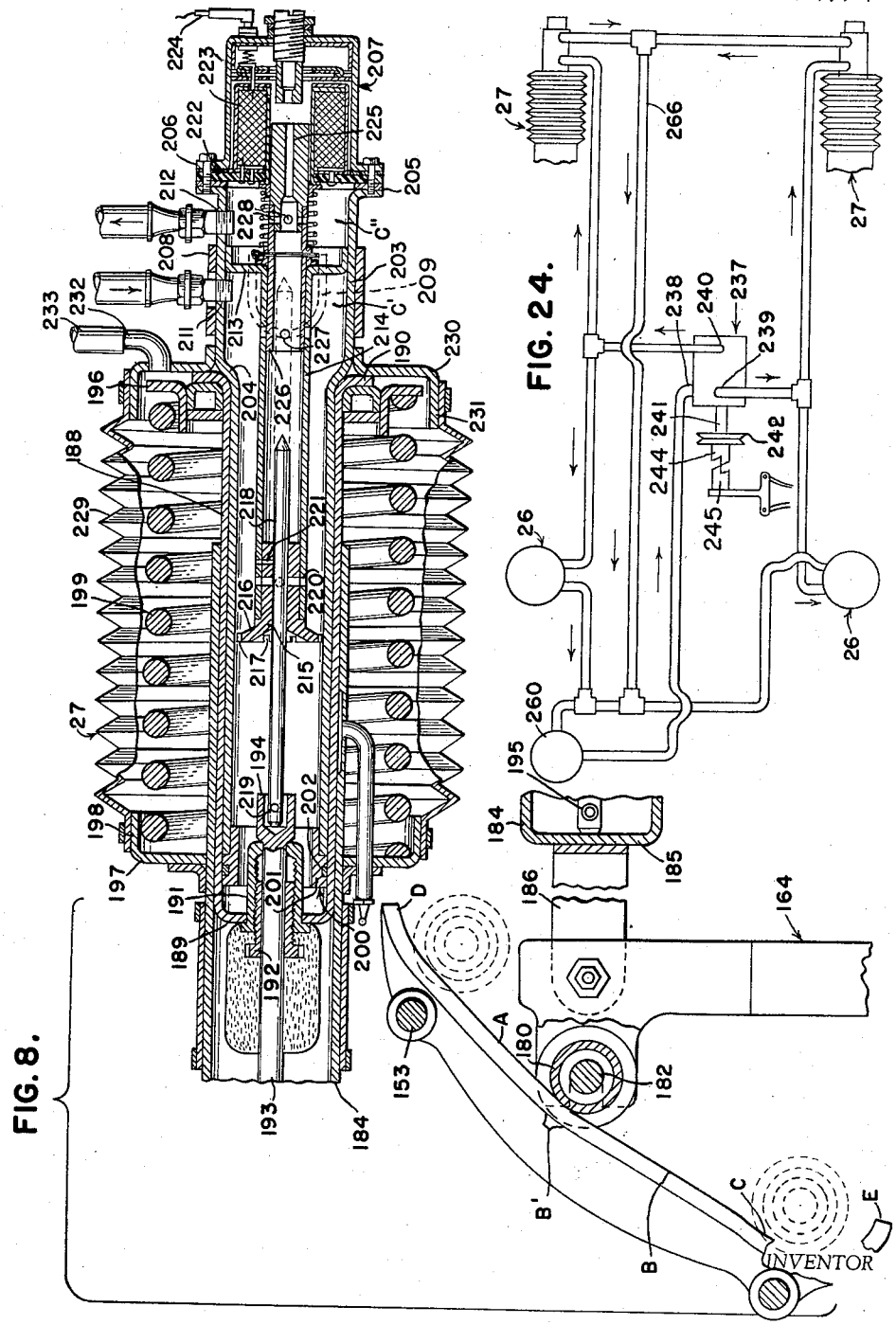

Sept. 15, 1959 G. H. TABER 2,904,343
MOTOR VEHICLE STEERING AND SPRING SUSPENSION MECHANISM
Filed April 29, 1955 10 Sheets-Sheet 8
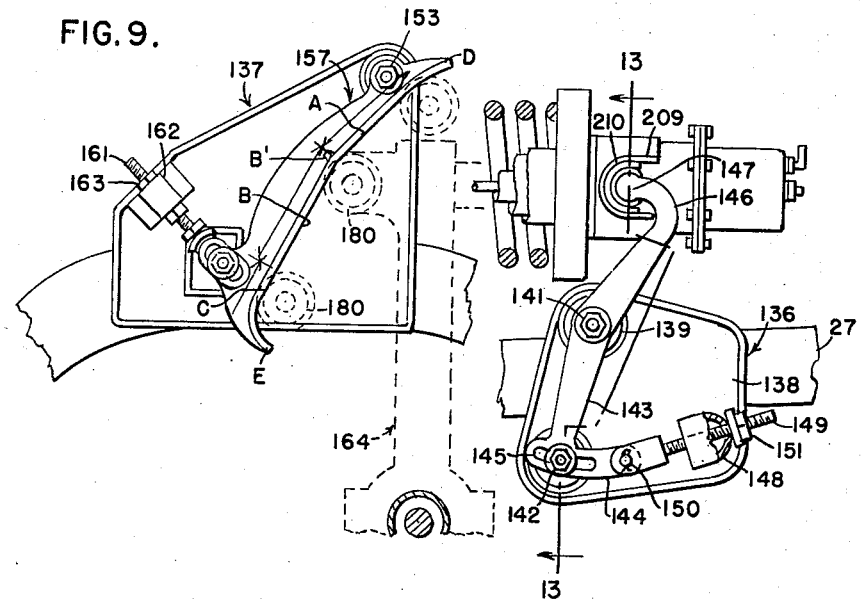
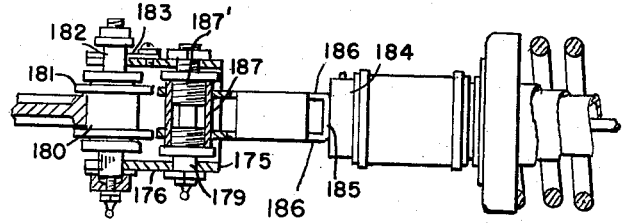
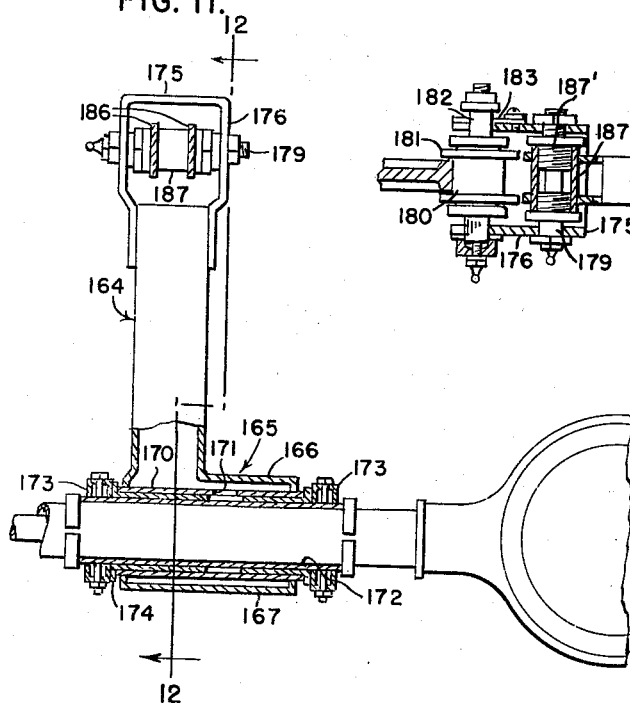
INVENTOR
GEORGE H. TABER
BY
ATTORNEYS Sept. 15, 1959        G. H. TABER        2,904,343
MOTOR VEHICLE STEERING AND SPRING SUSPENSION MECHANISM
Filed April 29, 1955        10 Sheets-Sheet 9
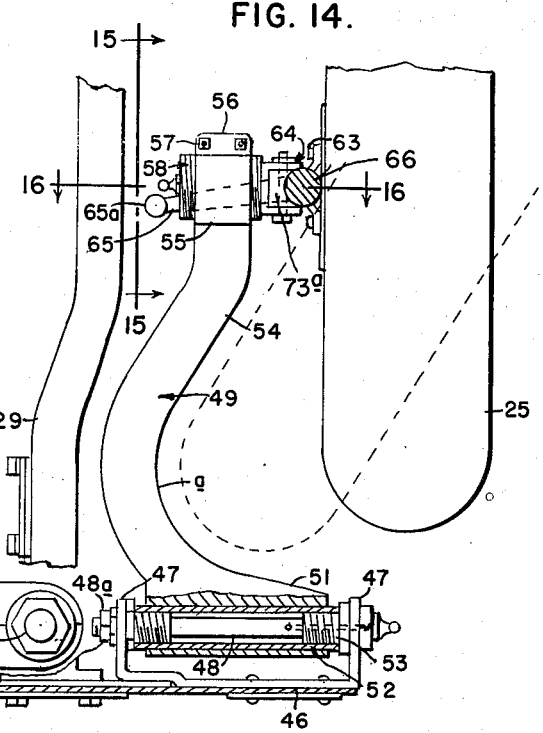
FIG. 14.
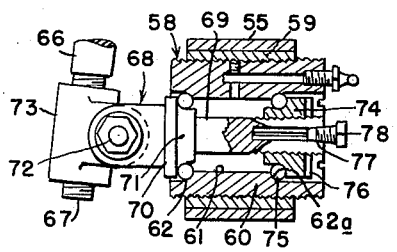
FIG. 16
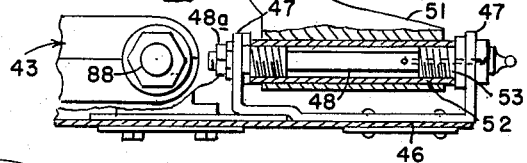
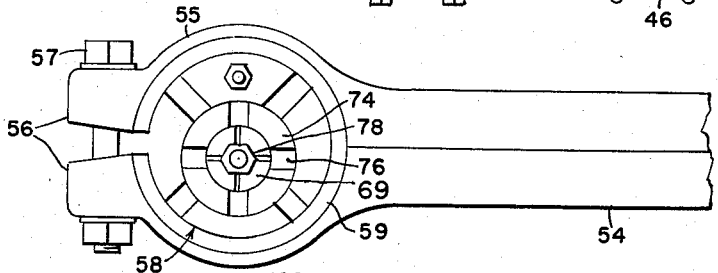
FIG. 15.
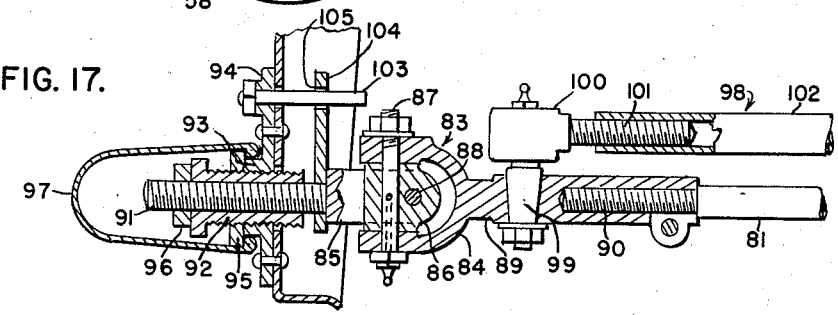
FIG. 17.
INVENTOR
GEORGE H. TABER
BY Shoemaker + Mattare
ATTORNEYS Sept. 15, 1959 G. H. TABER 2,904,343
MOTOR VEHICLE STEERING AND SPRING SUSPENSION MECHANISM
Filed April 29, 1955 10 Sheets-Sheet 10

INVENTOR
GEORGE H. TABER
BY *Shoemaker & Mattare*
ATTORNEYS

United States Patent Office 2,904,343
Patented Sept. 15, 1959

2,904,343

MOTOR VEHICLE STEERING AND SPRING SUSPENSION MECHANISM

George H. Taber, Elmira, N.Y.

Application April 29, 1955, Serial No. 504,807

47 Claims. (Cl. 280—43.18)

This invention relates generally to motor vehicles, more especially, but not necessarily to passenger vehicles and is directed to improvements in spring suspensions and steering mechanism for the same.

In present day motor vehicles the efficiency of the steering mechanism is not what it could or should be for the reason that it is not designed in a manner to avoid development of errors in wheel alignment or in wheel camber during operation of the vehicle. Such errors develop to a pronounced degree in the turning of the steerable front wheels when the vehicle is rounding a curve or when passenger weight, or weight of any other body, is greater on one side of the vehicle than on the other, while steering a straight course.

Also in the known front end independent wheel suspensions for motor vehicles, the range of relative movement between the vehicle body frame members and elements of the wheeled suspension mechanism, is not such as to allow for the employment of proper mechanism by which such errors can be avoided or excluded.

The present invention, therefore, has as one object to provide a new and novel mechanism in a motor vehicle body and frame construction, whereby the above referred to problems associated with front independent suspension wheel alignment, wheel camber and range of movement of the spring supported body, are effectively and efficiently met and thereby corrected or eliminated.

Another object of the invention is to provide a new and improved front end independent wheel suspension whereby a greater range of relative movement is permitted between the vehicle body frame and members of the wheel supporting structure whereby mechanical exclusion or avoidance of errors of wheel alignment and of wheel camber is obtained through better compliance with steering geometry requirements, by a parallelogram construction which maintains constant, steerable wheel camber relationship with the vehicle regardless of the range of relative movement between the body and the running gear wheels.

In conventional front end constructions for automotive vehicles, the operative connections between the front steering wheels and vehicle body is such that shocks produced incident to the passage of the vehicle wheels over an obstruction, or over a road depression, will be transmitted directly to the vehicle body. This results in discomfort to the occupant or occupants of the vehicle. Accordingly, a further object of the invention is to provide, in a manner as hereinafter set forth, a new and novel vehicle front end construction wherein the operative coupling between the front wheels of the running gear embodies pivoted rearwardly extending steerable wheel tractor arms which permit relatively free vertical swinging of the steerable running gear wheels and accordingly direct transmission of shocks and vibrations to the vehicle body is greatly reduced.

A further and more specific object of the invention is to provide in an automotive vehicle, a front end steering construction wherein the steerable wheels are connected, through a combination spindle bolt and steering knuckle, with a forward transverse element of the chassis frame by two parallel members forming with the combination spindle bolt and steering knuckle and said transverse element, a parallelogram structure, the parallel members of which are pivoted at their front ends for vertical swinging on transverse horizontal axes, whereby the wheels are disposed in trailing relation with said axes and will readily ride over raised roadway obstructions or depressions and the transmission of shocks to the vehicle body is accordingly reduced to a minimum.

Still another object of the invention is to provide, in a front end steering construction of the above described character, a parallelogram frame arrangement wherein the upper and lower parallel members, forming wheel tractor arms between the steerable wheels and a forward part of the vehicle frame, have a novel jointed or pivoted connection respectively between their rear ends and the upper and lower ends of the combination spindle bolt and steering knuckle embodying an adjustable, threaded eccentric means whereby proper adjustments for wheel camber and caster angle inclination may be easily and accurately effected.

Still another object of the invention is to provide, in a manner as hereinafter set forth, steering wheel tractor arms as above described, formed in a novel manner whereby to permit an extreme degree of steering turn for the wheels without bringing the wheel tires in contact with the arms.

A still further object of the invention is to provide in front end steering mechanism of the character stated, for an automotive vehicle, a transverse rocker arm or steering bar having operative connection at its ends with parallelly arranged steering tie-rods for transferring steering action from the left front steering wheel to the right side steering wheel or vice versa and supported centrally of its ends for turning movement on a vertical axis.

In conventional automotive vehicles the steering mechanism is of such character that misalignment can be brought about relatively easily, as a result of the wheel or wheels striking an obstruction. It is accordingly another object of this invention to provide a new and novel front wheel suspension and steering mechanism which is so designed that the possibility of misalignment occurring from unusual thrusts imposed on the wheels, is reduced to a minimum, due to alignment tie-rods which are parallel to the side surfaces of the wheel tires.

In the operation of automotive vehicles, side sway of the vehicle body incident to the movement of the vehicle along a curved path, brings about definite undesirable alteration in the steering wheel camber. In my prior application Serial No. 432,356, filed May 26, 1954, there is disclosed and claimed in association with spring suspension means, a means for effecting the automatic adjustment of steering wheel camber to a relation with momentary steering direction.

In the present application there is disclosed a similar means associated with the spring suspension, which embodies certain definite improvements. In the improved construction provision is made for employing two distinct conditions of spring suspension riding rate and control of steering by the employment of a manual means under the vehicle steering wheel whereby the steersman may select either condition of ride or steering. Under one condition it is possible to drive and steer the vehicle while the vehicle body is at its lowest possible elevation above the road surface and while the space between the body frame members and the running gear members (jounce space), and spring rate, are normal. Under the other condition an electrically controlled hydraulically actuated means maintains the vehicle body raised above the normal elevation for the purpose of relating steering wheel camber through gravitation, to the direction of steering caused by the steersman. Said automatic control also embodies suspension means of a new and novel character between the vehicle body and the rear axle housing furnishes added supporting power for a resilient means in relation to loads added to the rear of the vehicle.

Another object of the invention is to provide in motor vehicle resilient suspension means, wherein novel means is provided for elevating the effective rear resilient elements above the rear axle housing to a plane nearer to the vehicle body's center of gravity for the purpose of preventing contrary transverse vehicle body inclinations on turns, which affects contrary running gear steerable wheel camber.

A still further object of the present invention is to provide, in association with a rear element elevating means, a novel roller and cam means for obtaining straight upward and downward movement of the vehicle body, during relative movement between the body and chassis frame, whereby to prevent possibility of the body being moved transversely out of proper relationship between rear axle members and the vehicle body center line.

Yet another object of the invention is to obtain, by the provision of a parallelogram structure associated with each front wheel, a constant steerable wheel camber relationship with the vehicle body, regardless of the range of relative movement between the body and the running gear wheels.

The manner in which the foregoing and additional objects are attained will be readily apparent and the invention will be best understood from a consideration of the following detailed description taken in connection with the accompanying drawings forming a part of the specification with the understanding, however, that the invention is not confined to a strict conformity with the showing of the drawings but may be changed or modified so long as such changes or modifications mark no material departure from the invention as defined by the appended claims.

In the drawings:

Fig. 2 is a detail top plan view of the front end or steering mechanism with a portion of one front wheel and the connections between the same and the steering bar, the figure being taken upon an enlarged scale, with portions of the structure in section.

Fig. 5 is a section taken substantially on line 5—5 of Fig. 4.

Fig. 8 is a sectional view, on an enlarged scale, taken substantially on the line 8—8 of Fig. 1, the figure being divided into two parts.

Fig. 9 is a detail view on an enlarged scale showing front and rear end portions of the rear suspension rate control unit, with the intermediate portion being broken away.

Fig. 10 is a horizontal section taken substantially on the line 10—10 of Fig. 7.

Fig. 11 is a sectional view taken substantially on the line 11—11 of Fig. 7.

Fig. 14 is a detail section taken substantially on the line 14—14 of Fig. 4 and showing a portion of one side beam of the chassis frame and one end of the steering bar in top plan.

Fig. 15 is a view of the inner side of the rear end of one of the tractor arms as seen from the plane of line 15—15 on Fig. 14 looking in the direction of the arrows.

Fig. 16 is a sectional view taken substantially on the line 16—16 of Fig. 14, through only the camber-caster adjustment eccentric parts and a portion of the spindle, the connection between the spindle and the spindle bolt, together with the lower end of the spindle bolt being in elevation.

Fig. 17 is a horizontal section on an enlarged scale taken in the plane of section line 17—17 of Fig. 3 and showing partly in horizontal section and partly in top plan the steering tie rod and the drag link connected thereto.

Fig. 23 illustrates one means of housing a fresh air breather connected with the bellows enclosing the rear suspension rate control unit.

Fig. 24 is a diagram of the fluid system showing the connections between the front and rear hydro-electric units, the fluid pump and the starting and stopping clutch for the pump.

Fig. 25 is a diagrammatic view showing the face of the annular cam track and illustrating the areas which actuate the turn arm by which the turn signals and automatic distributor are controlled.

Figure 1:
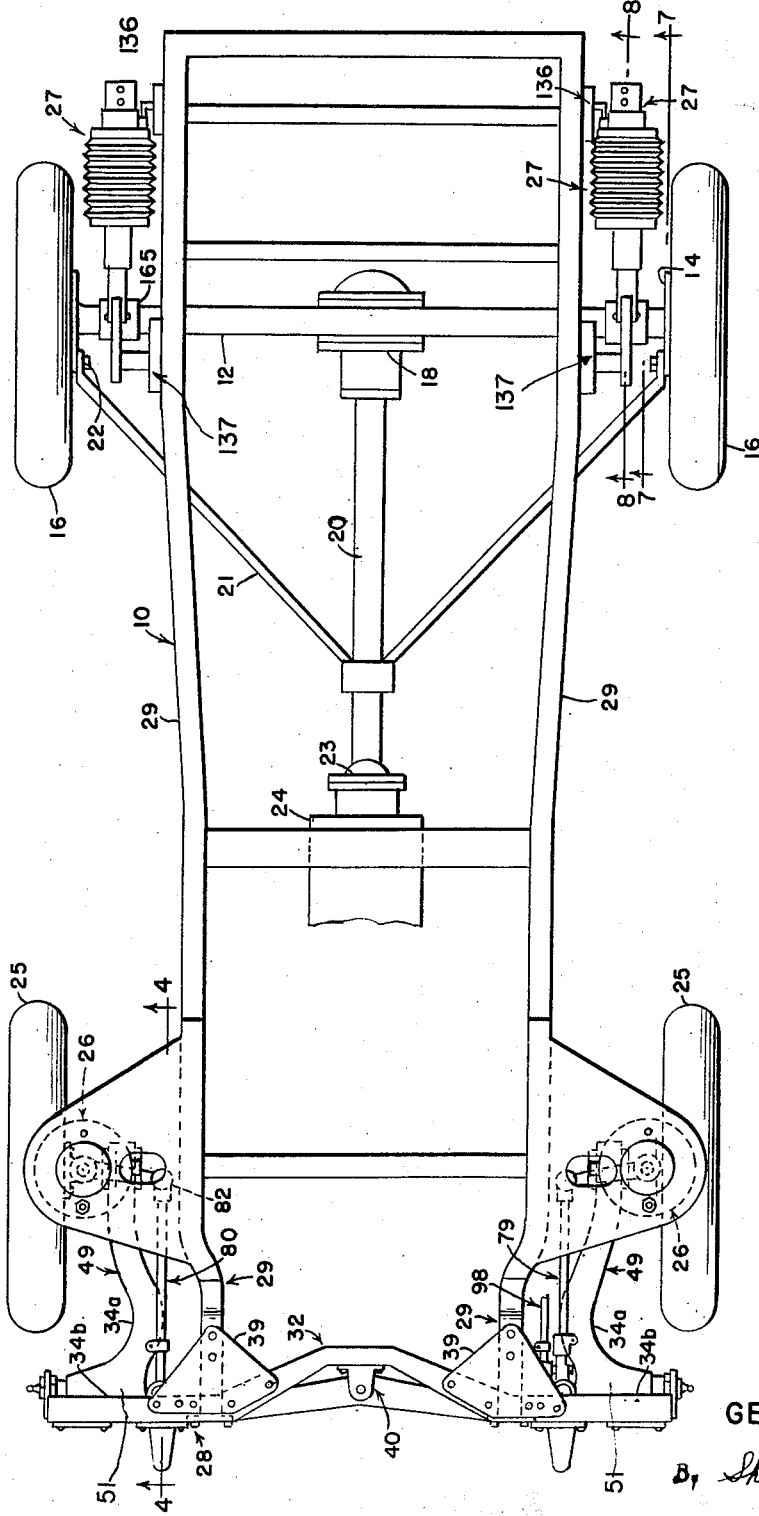
Fig. 1 is a view in top plan of a motor vehicle chassis showing the application thereto of the improved combined steering and spring suspension mechanisms of the present invention.

Referring now more particularly to the drawings Fig. 1 illustrates in top plan a conventional automotive vehicle chassis frame which is generally designated 10 and in association with which and the running gear supporting the same, are shown the improved steering mechanism of the present invention and elements of the spring suspension means.

In the structure illustrated in Fig. 1 the numeral 12 generally designates the rear axle housing at the outer ends of which are the conventional brake enclosing housings 14 and the rear wheels 16. The numeral 18 generally designates the differential housing with which is connected the drive shaft casing or tube 20. Secured to this casing or tube 20 are the radial rods 21 which at their outer ends are secured in the conventional manner to the housings 14. The numeral 23 designates a conventionally illustrated universal joint coupling while a portion of the vehicle transmission housing is diagrammatically illustrated and designated 24.

The vehicle front, steerable wheels are designated 25 and the mounting for the same together with the spring suspension means interposed between the combination steering knuckle and spindle bolt and the chassis frame will be hereinafter more particularly set forth.

The front end support or suspension means embodies the car body elevating hydraulic units 26 while the numeral 27 generally designates rear hydraulic elevating units disposed at opposite sides of the chassis frame and connecting the latter with the rear axle housing 12 in the manner hereinafter set forth.

*Front end construction*

Figure 4:
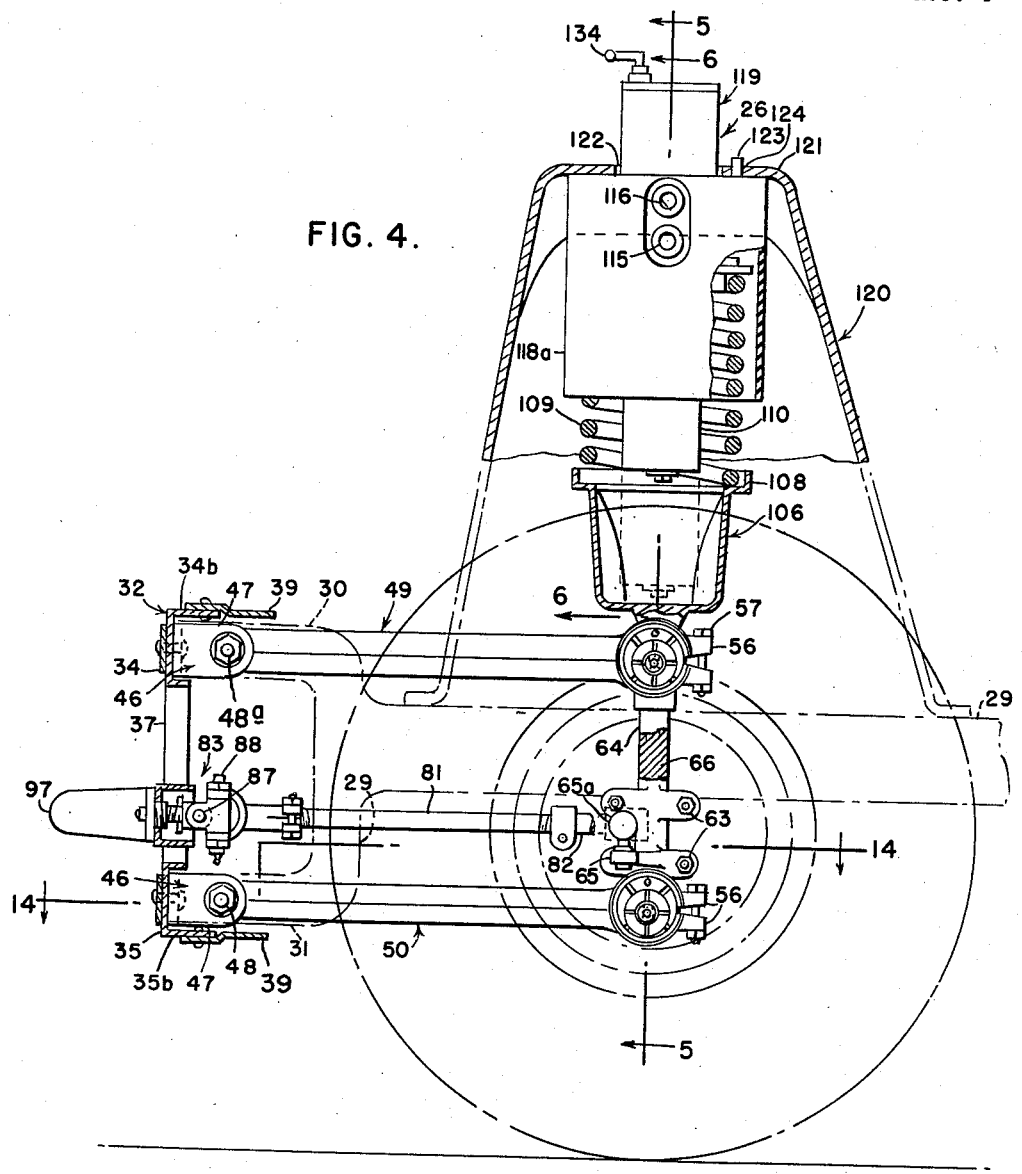
Fig. 4 is a sectional view taken in a vertical plane substantially on the line 4—4 of Fig. 1 looking toward the right front wheel.

The improved front end construction of the present invention is generally designated 28. In this construction, the forward ends of the side beams 29 of the chassis frame 10 are forked or bifurcated and slightly inset, as clearly shown in Fig. 1, where each bifurcation is generally designated 29 and the upper and lower furcations thereof are designated 30 and 31 respectively. These upper and lower furcations of each side beam of the chassis frame are vertically spaced one from the other as shown in Fig. 4.

Figure 3:
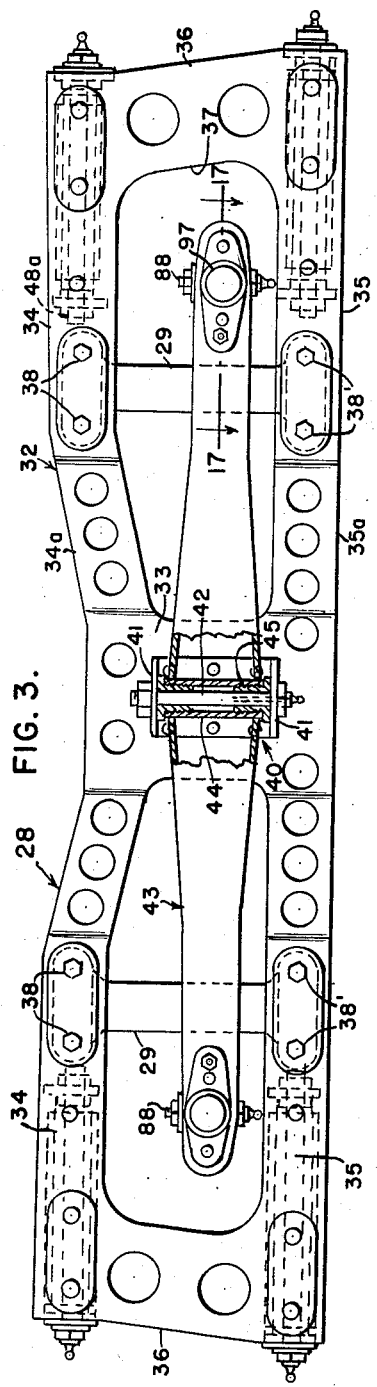
Fig. 3 is a view in front elevation of the front transverse support frame which forms a transverse element of the chassis frame and which supports the steering bar, a portion of the center of the steering bar being in vertical section.

The numeral 32 generally designates the front transverse support frame, the overall transverse length of which is materially greater than the width of the chassis frame as shown while the height of this frame at the outer ends is approximately equal to the height of the forked forward end portions of the chassis frame side beams. As shown in Fig. 3 the support frame 32 is a unitary structure which may be stamped or molded from a single sheet or plate of material and comprises the central plate portion 33 from the top and bottom portions of which extend the oppositely directed top and bottom arms 34 and 35 respectively. The outer ends of the top and bottom arms at the two sides of the central plate 33 are connected by the intermediate web portions 36. There are thus formed at opposite sides of the central plate 33 and between each pair of upper and lower arms 34 and 35 the opening 37.

As shown in Fig. 2 the inner end portions of the arms 34 and 35 are angled rearwardly as at 34a and 35a whereby the plate 33, which is positioned centrally between the side beams of the chassis frame or upon the longitudinal center of the frame, is rearwardly offset with respect to the arms 34 and 35.

The forked or bifurcated forward ends of the side beams of the chassis frame are connected across the openings 37 of the frame 32 as shown in Fig. 3, the upper furcations being bolted or otherwise suitably secured to the rear faces of the arms 34 as indicated at 38, while the lower furcations are bolted or otherwise suitably secured as indicated at 38' to the rear sides of the lower arms 35.

In order to increase the rigidity of the connection between the arms of the cross frame and the forked forward ends of the chassis side beams, brace plates 39, here shown as of substantially triangular form, are secured to the top and bottom rearwardly projecting flanges 34b, 35b of the frame arms and extend rearwardly for engagement with the adjacent furcations, the top plates being disposed over and upon the adjacent upper furcations 30 to which they are bolted or otherwise suitably fastened, while the lower plates extend beneath the undersides of the lower furcations and are secured thereto in a suitable manner as will be clearly seen upon reference to Figs. 1 and 2.

Secured to the forward side or face of the plate 33 is a bracket 40 having the vertically spaced forwardly projecting ears 41 through which extends the vertical pivot pin or bolt 42. This bracket plate and pivot bolt support a steering bar 43 which extends transversely across the front end of the chassis frame and lies in a horizontal plane located between the upper and lower arms 34 and 35 of the support frame as shown in Fig. 3.

Midway between its ends the steering bar 43 has extending transversely therethrough the vertically disposed sleeve 44 in the upper and lower ends of which are secured the bearing collars 45 which surround the pivot pin or bolt 42. It will thus be seen that the steering arm 43 is supported for turning movement about a vertical pivot lying on the longitudinal center of the chassis frame and the outer ends of the steering bar terminate short of the webs 36 but extend beyond the forked forward ends of the chassis side beams for connection with the hereinafter described steering tie-rods.

Secured to the rear face of each of the upper and lower arms 34 and 35 outwardly from the connection with such arm of the bifurcated fork is a wheel tractor arm bearing supporting bracket 46 which includes the two rearwardly extending ears 47 which are spaced apart in the direction of the length of the front support frame or transversely of the vehicle structure. Mounted between each pair of ears 47 and extending at its ends through suitable apertures in the ears is a pivot bolt 48, the outer end of which is headed as illustrated while the inner end carries the securing nut 48a whereby the bolt is rigidly secured to and between the ears.

At each side of the front end portion of the chassis frame, on the outer side of the chassis side beam 29 are a pair of wheel tractor arms disposed one above the other, the upper one of the arms being designated 49 and the lower arm being designated 50. These arms are of duplicate form or construction and each comprises a forward or head end 51 through which extends a bearing sleeve 52 having threadably secured in each end a bearing collar 53. The head 51 has a length slightly less than the distance between the ears 47 and the bearing sleeve 52 and collars 53 encircle the pivot bolt 48 and are maintained in position thereon between the ears 47 against axial movement but are permitted free turning movement about the axis of the pivot bolt.

The body 54 of each of the upper and lower tractor arms is preferably of hollow or tubular construction and is inwardly laterally bowed through the forward end portion thereof as indicated at *a* and terminates at its rear end in the split collar 55, each of the two portions of which collar terminates in the rearwardly directed or projected flange 56. These flanges are connected and may be drawn together by a pair of bolts 57 to firmly secure within the collar an eccentric bearing unit 58, about to be described.

Each of the split collars 55 has welded therein a split sleeve 59 which is internally screw threaded. The eccentric bearing unit 58 embodies an externally screw threaded cylindrical body 60 which is threaded into the split sleeve 59 and which has formed eccentrically therethrough the passage 61, which is of slightly enlarged diameter through a portion of its length at each end to form the ball races 62 and 62a. The axis of the passage or bore 61 through the body 60 is in parallel relation with the axis of the pivot bolt 48 at the forward end of the tractor arm.

Each of the front wheels 25 has secured to the inner side of the brake housing, by means of the bolts 63, the steering knuckle-spindle bolt unit 64 which carries the steering arm 65.

The steering knuckle-spindle bolt unit 64 embodies the heavy bolt body 66 and the upper end spindle 66a which is threaded at its top end as shown. The lower end of the bolt body 66 has the threaded stem 67 extending therefrom.

Surrounding the top end of the bolt body 66 where the spindle joins thereto is the shoulder 66b, the function of which is about to be described.

The steering knuckle-spindle bolt unit 64 is coupled with the vertically spaced rear ends of the adjacent upper and lower tractor arms by arbor units, each of which is generally designated 68. Each of these arbor units comprises the short arbor or spindle 69 which extends centrally through the bore 61 of the adjacent cylinder body 60. One end of the arbor 69 carries a head 70 which is formed to provide an inner ball race 71 which is in opposed relation with the race 62 formed in the adjacent end of the body 60. At the opposite side of the race 71 the head 70 is coupled by a bolt 72 with a sleeve 73 the axis of which is perpendicular to the bolt 72. In the arbor unit 68 which is carried by the lower tractor arm 50, the sleeve 73 is internally screw threaded for threaded engagement on the stem 67 as shown in Figs. 5 and 16, while the sleeve 73a of the upper tractor arm 49 is internally smooth for engagement about the spindle 66a as shown in Fig. 5.

Interposed between the sleeve 73a and the shoulder 66b is a bearing unit 73b upon which the sleeve 73a rests and turns and above the sleeve 73a and resting thereon is a mounting for the hydraulic suspension unit supporting spring, hereinafter described, which mounting is rotatably maintained in place by the upper end of the spindle 66a.

The end of the arbor or spindle 69 opposite from the ball race 71, as shown in Fig. 16, is threaded to receive the ball race nut 74 and interposed between this race nut and the adjacent raceway 62a, in the outer end of the body 60, and between the race 71 and the raceway 62 in operative relation therewith, are interposed the bearing balls 75 by which the rear end of the tractor arm is maintained in smooth free turning relation with the arbor 69.

The eccentric bearing units 58 provide a means for conveniently effecting caster-camber adjustment by rotating the cylindrical body 60 about the arbor and within the threaded sleeve 59. As will be readily seen the rotation of the body 60 not only effects axial movement of the body and the arbor unit but also changes the elevation of the arbor or spindle 69.

In order to effect secure locking of the race nut 74 after it has been threaded onto the spindle to the proper position, the free end of the spindle is provided with crossing longitudinal slots 76 and with an axial tapped bore 77 in which is threaded a tapered bolt 78 which effects the expansion of the portions of the spindle so as to bind such portions in the nut 74.

The free end of each steering knuckle arm carries the conventional ball or knuckle 65a and each of the arms is set at an angle to the turning axis of the adjacent wheel to locate the knuckle 65a a slight distance forwardly of such axis providing a turning radius compensation for the wheel illustrated by the spaced lines x—y on Fig. 2 which are perpendicular to the longitudinal axis of the chasiss frame and which respectively pass through the center of the spindle bolt and the adjacent steering knuckle.

The steering arm on one side of the vehicle is operatively coupled with the adjacent end of the steering bar 43 by the tie-rod which is generally designated 79 and the steering arm for the wheel upon the opposite side is operatively coupled with the adjacent end of the steering bar 43 by the tie-rod generally designated 80. Each of the tie-rods comprises an intermediate section, here shown as being tubular, which is designated 81 which is threadably connected at its rear end to a socket unit 82 of conventional form which receives the steering knuckle or ball 65a.

The forward end of the tie-rod is connected to the adjacent end of the steering bar by a universal joint coupling which is generally designated 83 and which embodies the two U-shaped yokes 84 and 85 disposed in right angularly related planes and having between the ends thereof the block body 86. This block body has two opposite faces which are opposed by the legs of one yoke as, for example, the yoke 84 and a pivot bolt 87 passes through the legs of this yoke and through the block as illustrated. Two additional oppositely positioned faces of the block are located in opposed relation to the inner faces of the leg portions of the other yoke, here designated 85, and a pivot bolt 88 passes through the leg portions of this other yoke 85 and through the block in right angular relation to the bolt 87.

The yoke 84 is formed integral with the relatively long shank 89 which has a threaded bore 90 formed therein from the free end thereof to receive the threaded forward end of the intermediate element 81.

The other forward yoke 85 of each universal coupling has a shank 91 formed integral therewith and screw threaded through its length as illustrated and this shank extends forwardly and is threadably engaged in and extends through an adjustment sleeve 92.

The sleeve 92 extends through an opening in the adjacent end of the steering bar and is threaded through a nut 93 forming a part of a mounting plate 94 which is fixed to the front side of the steering bar. Also threaded on the sleeve for engagement against the fixed nut 93 carried by the steering bar, is the lock nut 95 and threaded onto the forward end of the shank 91 and adapted to be brought into engagement with the forward end of the sleeve 92 is the lock nut 96.

As shown the lock nut 95 is of somewhat greater overall diameter than the fixed nut 93 against which it bears and thus forms a flange under which can be engaged the ribbed edge of the open end of an elongate dust hood or cap 97, in the manner illustrated.

By the provision of the intermediate portions 81 of the tie-rods with threaded connections between their ends and the socket member 82 the shank 89 of the universal joint wheel alignment adjustment may be readily effected as will be apparent.

At one side of the vehicle, here illustrated as the left hand side, there is provided the conventional steering drag link which is generally designated 98. Only the forward end portion of this link is illustrated as the rear end thereof may be connected with the pitman arm in the conventional manner to effect the desired forward and rearward movement of the drag link upon the turning of the steering wheel. For the attachment of the forward end of the drag link with the tie-rod the shank portion 89 of the universal coupling 83 on the left side of the vehicle, has secured therein the mounting or coupling stud 99 which forms at one end, one part of a ball and socket coupling which is generally designated 100 and which includes a rearwardly extending threaded stem 101 which forms a part of the drag link structure, of which a second part comprises the tubular rod 102 into the forward end of which the stud 101 is threadably engaged.

The drag link 98 is disposed substantially in a horizontal plane with the tie-rod adjacent thereto and in order to maintain this relationship between the link and tie-rod there is provided the guide pin 103 which is secured at one end in the nut plate 94 and projects rearwardly from the transmission bar in spaced parallel relation with the threaded stud 91 forming the forward end portion of the universal coupling 83.

The rear end of this threaded stud 91 has rigidly secured thereto an end of a plate 104 which extends laterally toward the pivotal center of the transmission bar and has a guide opening 105 through which the rearwardly extending guide pin 103 projects. The guide pin 103 functions to prevent rotational movement of stem 91, by road shocks or when turning adjustment nuts 92 or 96.

*Electro-hydraulically controlled body suspension mechanism—front end*

In my prior application hereinbefore referred to provision is made for maintaining an elevated condition of the vehicle body relative to the chassis and running gear above the normal elevation. Means is also provided to effect the lowering of either side of the vehicle automatically in response to tilting of the body resulting from movement of the vehicle along a curved path or from uneven loading, to restore the body to a substantially level condition and counteract the effect of such tilting upon the steering wheel camber, particularly in steering control of the vehicle while traveling along a curved path.

The present application embodies certain of the structural features of the referred to prior application with improvements such as a novel means for manually governing the operation of the body elevating units. Such improvements also embody a new and novel form of electro-hydraulic elevating unit interposed between the rear axle housing of the automotive vehicle and the body supporting chassis for automatically controlling the body elevation to maintain a substantially constant jounce spacing and for applying an added hydraulic pressure against the body spring suspension means to restore the body to initial elevation after being lowered by added passenger load, and means also being provided to elevate the effective resilient element, or spring suspension means, to effect the support of the rear end of the vehicle to a nearer relationship to the center of gravity of the car body. The front electro-hydraulic units 26 are supported upon the upper ends of the steering knuckle-spindle bolt units 64, and provide the means by which the front end of the chassis frame is supported on the spindle bolts. These units are of substantially the same construction as the electro-hydraulic units shown in my prior application hereinbefore referred to and one of such units is shown in longitudinal section in Fig. 5 and since the detail features of this unit are set forth in the co-pending application only a general description will be given here sufficient to make clear the operation of the unit in the system of which it forms a part.

Each of the electro-hydraulic units 26 comprises a spring mounting which is generally designated 106 and which comprises a top annular portion 108 upon which the coil spring 109 is mounted and a lower end collar portion 107 which is, in contradistinction to the same part in the unit of my prior application above referred to, internally smooth or unthreaded, and receives for turning movement therein, the upper end portion of the spindle 66a, upon the threaded portion of which is engaged a retaining nut, as shown, which prevents separatory movement between the collar 107 and the sleeve 73a upon which the collar rests.

The numeral 110 designates a fluid cylinder which is disposed axially within the coil spring and which carries a top flange 111 which rests upon the top of the spring.

The head 112 is formed to provide a fluid admission chamber 113 and a fluid exhaust chamber 114 with which are respectively coupled the inflow and outflow nipples 115 and 116. Formed integral with the head 112 is the hollow piston 117 which is slidably positioned in the cylinder 110.

The top of the head 112 is formed to provide a plate 118 and supported upon and rising from this plate concentrically with the piston and cylinder is the motor housing 119.

When the units 26 are mounted upon their respective spindle bolts they extend upwardly therefrom each into an upstanding suspension bracket structure which is generally designated 120 and is mounted on, secured to and rises from the adjacent chassis side beam 29 as is most clearly shown in Fig. 4. This suspension bracket 120 includes a top wall 121 in which is formed a central opening 122. The plate 118 of the unit 26 bears against the underside of the wall 121 and the motor housing 119 extends upwardly through the opening 122 and in order to maintain the unit against any tendency to rotate the plate 118 is provided with the upstanding pin 123 which enters an aperture 124 formed in the top 121 of the bracket.

Suspended from the plate 118 and encircling the major portion of the spring 109 is a protective skirt 118a of rubber or other suitable material designed to prevent accumulations of mud and dirt upon the spring which might interfere with the action of the suspension unit.

Secured to the head 112 and extending downwardly axially into the hollow piston 117 is a fluid release tube 125, the upper end of which opens into the outlet chamber 114. This tube 125 has a number of wall apertures as shown in dotted lines at 126 for exhausting fluid from within the piston and piston cylinder when opened by the hereinafter described motor operated valve, under the conditions hereinafter set forth.

Within the motor housing 119 is the motor unit generally designated 127 which comprises a pair of electromagnets 128 secured against movement to the top of the housing and an armature 129 rotatably supported by the downwardly extending stem 130 which passes through the outlet chamber 114 and enters the upper end of the tube 125. The portion of this stem which lies in the outlet chamber 114 and the upper end of the tube 125, has the axial bore 131 therein which opens at its lower end into the tube 125 and is provided with wall ports 132 adapted to register with the ports 126 upon the rotation of the stem to a predetermined extent. The upper end of the bore 131 has the ports 133 which are permanently in communication with the fluid outlet chamber 114.

The motor magnet coils 128 are grounded at one end to the housing while the other end of the coils which are electrically connected together, are connected with the terminal 134 which extends outside the housing 119 for convenient connection with the control circuit wiring hereinafter described.

Under certain conditions of operation of the hydraulic system hereinafter described, fluid under pressure is introduced through the chamber 113 into the cylinder 110 to cause the projection of the piston 117 outwardly so as to elevate the adjacent side beam of the chassis frame with respect to the running gear and under this condition the motor unit 119 is de-energized so that the armature is maintained by the spring 135 in a position where the ports 126—132 are out of registration. Upon energization of the motor unit the armature 129 will be rotated to turn the stem 130 so as to bring these ports 126—132 into registration thereby allowing the fluid to escape through the chamber 114 to permit the elevated portion of the chassis frame to lower, by force of gravitation.

*Rear end spring rate control hydroelectric unit*

The electro-hydraulic units 27 provide the supporting means between the rear ends of the side beams 29 of the chassis frame and the adjacent underlying axle housing 12 through the medium of a mounting plate unit 136 and a thrust plate and cam unit 137.

The unit 136 comprises the plate body 138 which is secured to the outerside of the chassis frame side beam 29 rearwardly of the rear axle housing 12 and this plate body carries on its outerside the outwardly projecting upper and lower spacer arms 139 and 140 respectively which, respectively, carry the outwardly extending mounting pins or bolts 141 and 142.

The numeral 143 designates a bracing arm which is mounted for turning movement on the upper bolt 141 and carries upon its lower end the transversely extending arcuate plate 144 which has formed therein the arcuate slot 145, the arc of which is struck from the arm supporting bolt 141.

The upper end of the bracing arm is forked or bifurcated and the two furcations 146 extend upwardly in divergent relation and each terminates in the rearwardly directed trunnion heads 147.

The bracing arms 143 are rocked about the supporting pivot bolts to set the trunnion heads forwardly or rearwardly in an adjusted position for the purpose hereinafter set forth and in order to effect the rocking of the arms and the fixing of the same in adjusted position there is provided upon the outerside of the plate body 138 rearwardly of the curved or arcuate plate 144, an abutment member 148 through which is extended the relatively long threaded rod or bolt 149 which at its forward end is pivotally connected as at 150 with the adjacent end of the arcuate plate.

Threaded upon the bolt or rod 149 at the rear side of the abutment member 148 is the holding nut 151 which by contact with the adjacent abutment member prevents the forward movement of the lower end of the arm beyond a desired position.

The lower bolt 142 passes through the arcuate slot 145 and functions as a guide for the lower end of the pivoted arm.

The thrust plate unit 137 embodies a plate body 152 of suitable dimensions which is secured against the outerside of the chassis side beam 29 above and slightly forwardly of the axle housing. This plate body 152 is approximately in the same vertical plane as the plate body 138 and it carries like the plate body 138, the upper and lower outwardly projecting short arms 153 and 154 respectively. These arms carry the outwardly projecting bolts, the upper bolt being designated 155 and the lower bolt being designated 156.

Figure 7:
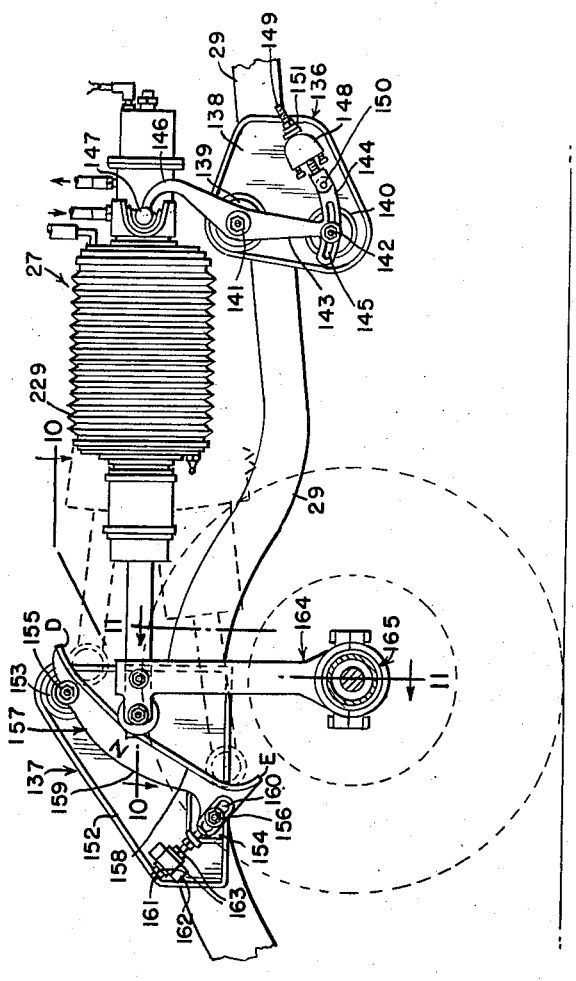
Fig. 7 is a sectional view, on an enlarged scale, taken substantially on the line 7—7 of Fig. 1 showing the rear suspension spring rate control unit.

As shown in Fig. 7, the upper arm 153 and bolt 155 carried thereby is positioned approximately directly above the axle housing while the lower arm 154 and bolt 156 is forwardly thereof and supported by and extending between these bolts at an upward and rearward inclination is a cam bar 157. This cam bar is approximately of T-cross section, the part corresponding to the head of the T forming a wide cam track 158 while the portion corresponding to the stem forms a web 159 extending through the length of the back of the track 158. One end of the bar has the web provided with a suitable aperture to receive the upper or anchor bolt 153 upon which the cam bar swings and at its lower end the web portion of the cam bar is suitably formed to have a shaft arcuate slot 160 therethrough which is struck from the center of the pivot bolt 153 and receives the lower or anchor bolt 156.

The rear edge of the flange or web 159 has extending therefrom at the end of the slotted portion 160, the threaded adjustment bolt 161 which passes through a guide abutment 162 which is fixed to the plate body 152 and threaded on this bolt upon opposite sides of the guide 162 are the securing nuts 163 which hold the bolt in adjusted position. By this means the lower end of the forwardly inclined cam bar can be swung to increase or decrease the angle of inclination of the cam track.

The face of the cam 158 is of generally arcuate form or contour but is divided in a number of straight sections which are designated A, B and C. The uppermost one of the sections which is designated A joins or merges into the rearwardly curved terminal portion D while the lowermost section, designated C joins or merges with the downwardly and rearwardly curving terminal portion E which functions as a stop for the downward movement of the hereinafter described cam follower roller.

The uppermost inclined straght section A is disposed at an angle of approximately 45° to the vertical while the middle and somewhat longer straight section B is inclined in the same direction as the uppermost section but at a sharper angle being approximately 30° to the vertical. These portions or zones A and B of the cam track may be defined as the normal spring rate zone which is zone A and the elevated ride zone which is the zone B.

The lowermost zone C has an angle slightly less than that of zone B.

Adjacent to the upper end of zone B the cam track has a location marker B' thereon, the purpose of which will be hereinafter described.

Mounted upon the rear axle housing in the vertical plane of the adjacent cam track is the car body support arm 164. The lower end of this arm is formed to provide the transverse longitudinally divided or split cylindrical shell 165 which embodies the arm attached half 166 and the removable lower half 167.

The longitudinal edges of the halves of the shell are flanged as indicated at 168 and these flanges are joined together by tie bolts 169.

Each of the shell halves has a semi-cylindrical liner 170 which extends at its ends beyond the ends of the shell in which it is secured by welding or other suitable means and the upper one of these liners has an oiling opening 171 therethrough for the purpose about to be described.

Extending through each of the split shells is a split bearing sleeve 172 which rests directly upon the axle housing and is clamped in place by a split clamp ring 173 which encircle the ends of the bearing sleeve and in each end of the split bearing sleeve and interposed between the same and the split liner 170 are the non-metallic molded, graphited and flanged body support bearings 174. Thus each car body supporting arm 164 is maintained upon the rear axle housing for rocking motion and the arm extends upwardly and when in perfectly vertical position is directed toward the curved upper end D of the adjacent cam track.

Suitable means is provided for introducing lubricant into each split shell from which it will pass through the opening 171 to the annular space between the adjacent ends of the supporting bearings 174.

The upper end of each support arm 164 carries the upstanding rectangular frame 175, each of the side portions 176 of which carries the forwardly projecting flange 177 which is provided with the forwardly opening slot 178.

Extending transversely of the frame 175 between the side members 176 thereof is an arbor 179 with which is connected, in the manner hereinafter set forth, the outer end of the guide sleeve of the hereinafter described electrohydraulic unit.

The numeral 180 generally designates a cam follower roller which engages the cam face and carries the end flanges 181 by which it is retained in operative contact with the cam. This cam roller is mounted upon a supporting arbor 182 the ends of which are positioned in the slots 178. One end of this arbor 182 is flattened on opposite sides to fit in its slot whereby the arbor is held against rotation while the opposite end of the arbor is engaged by a retainer plate 183 which is secured against the outer side of the adjacent flange 177 as illustrated.

Figure 6:
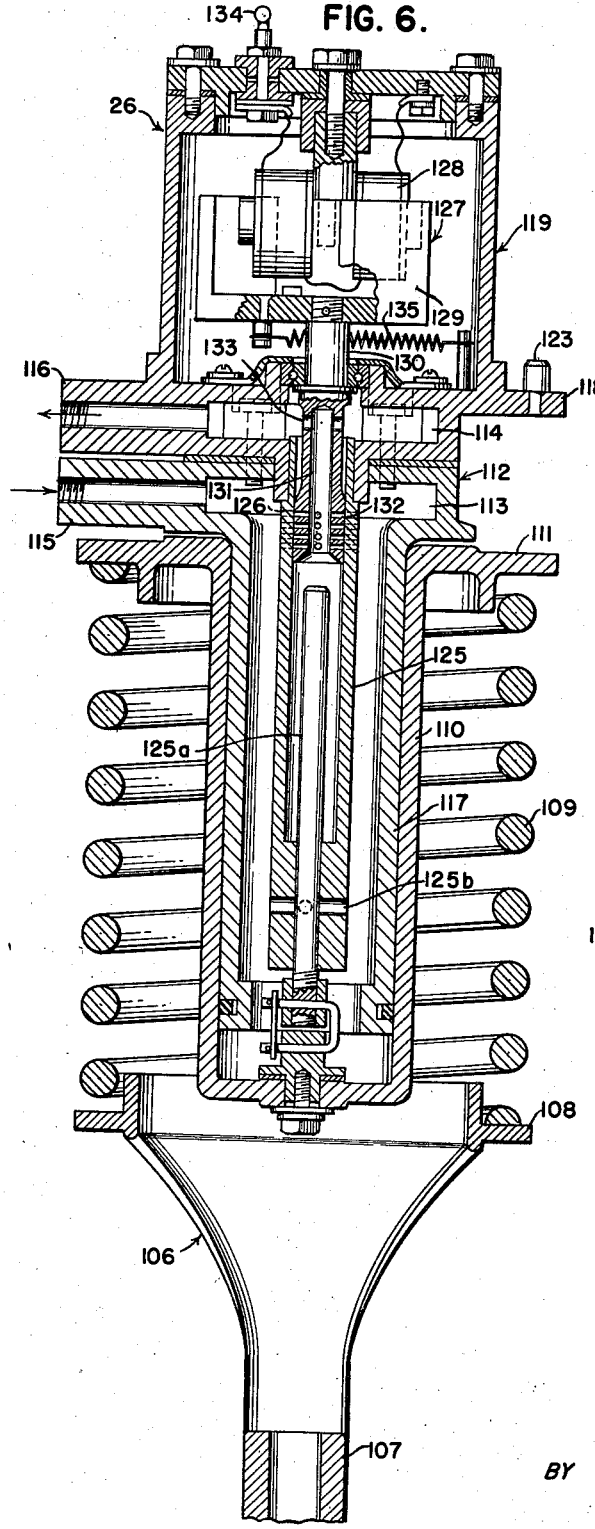
Fig. 6 is a vertical longitudinal section taken substantially upon the line 6—6 of Fig. 4 through the electro-hydraulic unit only.
Figure 12:
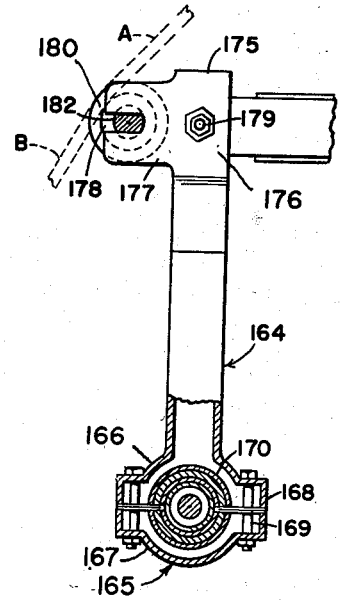
Fig. 12 is a sectional view taken substantially on the line 12—12 of Fig. 11.

The rear electro-hydraulic units 27 are supported horizontally between the trunnion heads 147 of the bracing arms 143 and the upper ends of the body support arms 164 as illustrated in Fig. 6. These units are of duplicate form or construction and accordingly the description will be confined to one unit only.

Referring now particularly to Figs. 8 and 10, the numeral 184 designates a guide sleeve having a closed outer end 185 to the outer face of which is welded or otherwise secured two longitudinally extending spacing arms 186.

The outer ends of the spacing arms 186 carry the transverse bearing supporting sleeve 187 in the two ends of which are secured, preferably by screw threads, the bearing bushings 187'. The sleeve 187 and bushings 187' are disposed within the frame 175 between the sides 176 and have the supporting arbor 179 passing therethrough. Accordingly, it will be seen that the arbor supports the outer end of the guide sleeve 184 the open inner end of which is supported in the manner about to be described.

Slidably extended into the open end of the guide sleeve 184 is the hydraulic cylinder 188, the inner end of which is closed by the head 189 while the outer and rear end carries the encircling flange 190. As shown the open end of the guide sleeve 184 is spaced a substantial distance from the flange 190 so that the hydraulic cylinder may be permitted substantial sliding movement in the sleeve.

The inner end 189 of the hydraulic cylinder has secured therein the inwardly projecting short tubular guide 191 into the outer end of which is threaded the packing retaining bushing 192 and extending through this bushing and through the inner end of the sleeve 191 is a short rod 193 the inner end of which is formed to provide a coupling socket 194 while the outer end, which terminates adjacent to the guide sleeve end wall 185, is connected to the guide sleeve by the transverse pin 195.

Encircling the hydraulic cylinder 188 at the flanged end and bearing against the flange is a spring abutment or thrust collar 196 while the guide sleeve 184 carries adjacent to the forward end thereof the spring stop plate 197 which carries the peripheral flange 198. This plate is firmly secured to the guide sleeve as by welding or in any other suitable manner.

Encircling the interengaged or telescoped portions of the guide sleeve and hydraulic cylinder is the body suspension spring which is generally designated 199 and which bears at one end against the plate 197 while the other end bears against the flange thrust collar 196.

The numeral 200 generally designates the hydraulic piston which fits snugly within the hydraulic cylinder through the flanged end thereof and carries at its inner end the annular head 201 which is exteriorly grooved or channeled to receive packing material 202 which engages the inner surface of the cylinder as illustrated. When this head is at the innermost position in the cylinder, that is, when the hydraulic piston is at the limit of its inward movement, the packing sleeve 191 extends into the head and is spaced therefrom to allow for the passage of fluid from the piston, which is tubular or hollow throughout its length as shown, into the adjacent or inner end of the hydraulic cylinder.

The hydraulic piston has an outer or rear end portion of enlarged diameter which is designated 203 and at the line of enlargement of this outer end portion is formed the encircling shoulder 204 which when the piston is at the limit of its inward movement is in opposed relation to the flange 190.

The open end of the enlarged portion 203 is defined by the out turned encircling flange 205 to which is secured a corresponding flange 206 forming an integral portion of the electric motor enclosing housing 207.

The enlarged portion 203 of the hydraulic piston is encircled by a reinforcing collar 208 and this collar carries the diametrically oppositely positioned laterally projecting cradles 209 which open rearwardly and in each of which is received a trunnion head 147.

The bottom of each cradle has positioned therein a non-metallic bearing bushing 210 which is, of course, interposed between the cradle and the trunnion head. This bushing may be fixed to the bottom of the cradle or may be bonded to the trunnion head or member as may be desired.

Thus the rear end of the electro-hydraulic unit is supported by the trunnion heads through the medium of the reinforcing collar 208 and the cradles carried thereby and as previously set forth, the trunnion heads are directed forwardly and thus oppose the rearward push or thrust which is applied to the hydraulic unit in the operation of the same.

The enlarged rear end portion 203 of the hydraulic piston is also provided with fluid inlet and fluid outlet wall ports which are respectively designated 211 and 212 and interiorly the enlarged portion 203 of the hydraulic piston carries the partition plate 213 which is located between the ports 211 and 212.

The partition plate 213 has a central opening in which is fixed one end of a tube 214 which extends forwardly therefrom into the hydraulic piston through approximately half the length of the latter. In the inner end of this tube 214 is secured an axially bored guide 215 which carries an encircling flange 216 the periphery of which closely approaches the surface of the hydraulic piston in which it is located and this flange is provided with a series of notches 217. This flange constitutes a valve centering support for the plunger type valve stem 218 which has one end connected in the coupling 219 as shown while the other end passes through the bore of the guide 215 and into the tube 214 in the manner shown.

The guide 215 and the encircling portion of the tube have formed therethrough the radially directed control ports 220 which under normal operating conditions the stem 218 maintains closed whereby communication between the interior of the hydraulic piston and the interior of the tube 214 is shut off against the passage of fluid into the tube from the piston in the manner hereinafter described. The tube 214 constitutes a portion of an exhaust passage for conducting fluid from the hydraulic piston to the outlet port 212 in the manner hereinafter set forth.

Also formed through the wall of the tube 214 and the guide 215 inwardly from the ports 219 is a smaller restricted port 221.

Interposed between the flanges 205 and 206 is a plate 222 of insulation to which is secured the solenoid windings or coils 223 of the electric motor which is located within the housing 207. The numeral 224 designates an electric terminal on the outer side of the housing 207 which is electrically connected with the coils or windings 223. Slidably positioned in the center of the solenoid winding is the metal armature core 225 which projects through a central opening in the plate 222.

The partition plate 213 which is located between the inlet port 11 and the outlet port 12 divides the hydraulic piston into two chambers which are designated C' and C''. The chamber C' receives piston operating fluid in the manner hereinafter set forth, through the port 211 and the chamber C'' receives the outflowing fluid which leaves by the port 212 in the manner hereinafter described.

The armature core 225 is connected with the slidable valve sleeve 226 across the chamber C'' and which sleeve extends into the adjacent end of the tube 214 and normally closes the fluid pressure release ports 227 which are formed through the wall of the sleeve 214 as illustrated.

The armature core 225 is of steel while the valve sleeve 226, which is attached to the armature core, is of non-magnetic metal.

At the outer end of the valve sleeve 226 where it connects with the armature core 225 are outlet ports 228 discharging into the chamber C'' whereby when the motor is energized and the armature core 225 is drawn outwardly so as to cause the valve sleeve to uncover the release ports 227, fluid under pressure may flow from the hydraulic piston through the sleeve into the chamber C''.

Since the units 27 are located in close proximity to the rear wheels of the motor vehicle they will receive mud and dirt thrown off from the wheel and, therefore, in order to protect the sliding parts such as the guide sleeve 184 and the hydraulic cylinder 188 where they are overlapping and also to prevent accumulation of mud on the spring, there is provided an encasing bellows sleeve 229 which at one end encircles the flange 198 of the stop plate 197, to which it is secured in a suitable manner as shown while the other end of the sleeve encircles and is closed by an abutment plate 230 having the flange 231 to which the adjacent end of the sleeve 229 is secured.

As shown, the abutment plate 230 also functions as a stop against which the flange 190 of the hydraulic cylinder comes to rest when the piston is at the limit of its movement in the cylinder.

In order to provide for the free exchange of clean air in the bellows sleeve, the abutment plate 230 has fixed therein an end of a nipple 232 with which is connected one end of a rubber tube or hose 233.

The elevated rear end portion of each rear fender directly above the electro-hydraulic unit 27 has extended downwardly therethrough and secured thereto an end of a breather nipple 234 and there is provided a suitable cover over the nipple such as the glass or plastic housing 235 which is secured to the top of the fender in a suitable manner as illustrated and which may have installed therein an incandescent lamp 236 connected with the car lighting system so as to be illuminated when the car lights are on. This light may be provided to function as an added tail light, or to illuminate lettering identifying the car model, the method of spring suspension employed for the vehicle body, or to detect any accumulation of undesired matter within the glass housing.

The nipple 234 has its upper end or air inlet and discharge end directed rearwardly and downwardly toward a suitable air channel 235' formed in the material of the fender and passing downwardly and outwardly below the rear part of the light housing 235 as shown. The other end of the tube 233 is connected to the nipple 234 and therefore it will be seen that as the bellows is expanded and contracted with the corresponding movements of the car rear spring action air will be drawn into the bellows and exhausted therefrom by way of the nipples 232, 234 and the tube 233 and also by way of the channel 235' passing below the rear part of the light housing.

In my prior application hereinbefore referred to there is disclosed a fluid distribution system embodying a fluid pump, a reservoir and pipe lines leading from the pump to the front and rear hydroelectric elevating units and back to the reservoir, the pump being operatively connected with the motor vehicle engine whereby when the engine is operating fluid under pressure is conveyed to the cylinders of the elevating units to maintain the vehicle body at a predetermined elevation above the running gear. Also associated with this system is an electrical system in which are connected the valve operating motors of the hydraulic units. This electrical system is controlled by an inertia switch which is affected by the transverse tilting of the vehicle body, so that when the body tilts toward one side or the other the electric motor operated valves for the units at the opposite side will be energized to open the valves so as to permit fluid to flow from the units back to the reservoir and thus lower the elevated side of the vehicle.

Figure 18:
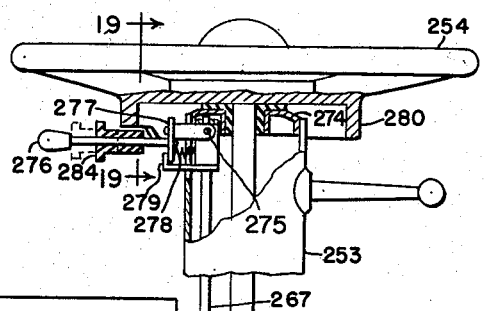
Fig. 18 illustrates diagrammatically the electrical system for controlling the hydro-electric front and rear elevating units, in association with the conventional vehicle turn signal system, also illustrating the manual means and inertia actuated means for operating the hydroelectric units.
Figure 20:
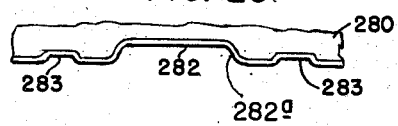
Fig. 20 is a view illustrating in linear arrangement of the indentures in the face of the control cam.

In the present application a somewhat similar fluid system is employed together with a similarly operated electrical system, these systems being diagrammatically shown in Figs. 18 and 24. In the present hydraulic and electric systems, however, the operation of the fluid pump can be discontinued by the operator of the vehicle while the motor is running if it is desired to operate the vehicle with the body in a lowered position.

Figure 22:
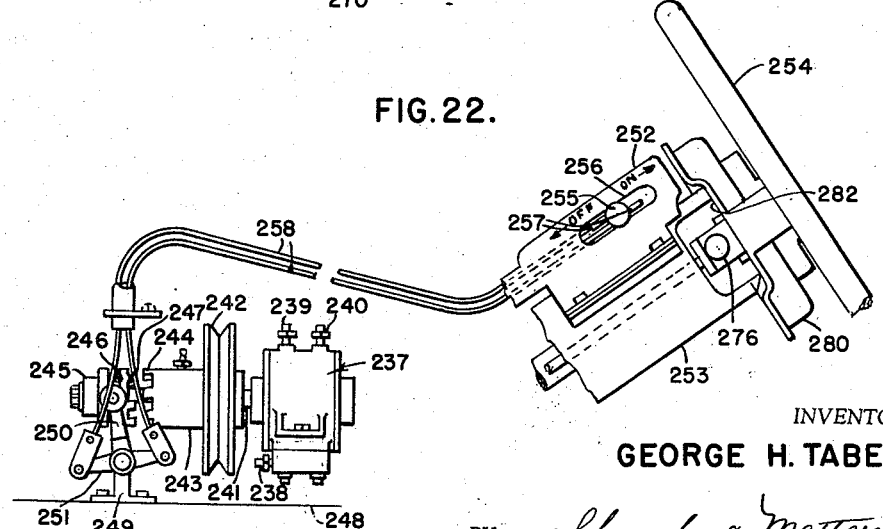
Fig. 22 illustrates the starting and stopping control clutch for the fluid pump and the manual controls adjacent to the hand steering wheel.

Referring now to Fig. 24 in which the hydraulic system is diagrammatically shown and to Fig. 22 where the hydraulic pump control is illustrated, it will be seen, referring now to Fig. 24, that there is provided an hydraulic pump which is generally designated 237 which has a fluid inlet 238 and two outlets 239 and 240.

The pump 237 has the shaft 241 upon which is secured a V-belt pulley 242. The pump is located in the suitable position on the chassis frame where belt connection may be made with the fan belt shaft or any other suitable part from which to take power to rotate the pump shaft when the engine is running.

The hydraulic fluid entering each of the rear electrohydraulic units passes into the chamber C' and through the tubular piston 200 into the cylinder 188. The cylinder will thus be forced forwardly, carrying with it the suspension spring 199 which in turn forces the guide sleeve forwardly. This effects the application of pressure against the cam bar and the rocking of the body support arm 164. Since the cam bar is held rigidly against movement relative to the chassis frame beam to which it is attached the camming action of the cam follower roller 180 against the cam track will effect the lifting of the vehicle body. Without the fluid pressure in the hydraulic cylinder the normal position for the body elevating arm 186 is vertical with the cam follower roller opposite or in line with the indicator B' at the side of the cam bar web. This normal position of the rear elevating units is the position of the unit illustrated in Fig. 8.

Figure 13:
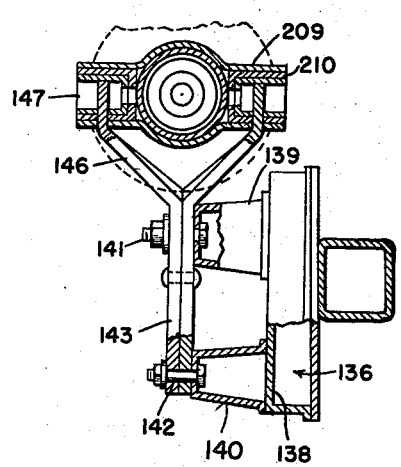
Fig. 13 is a sectional view taken substantially on the line 13—13 of Fig. 9 with a portion of the mounting plate and the upper spacer arm remaining in elevation.

When the fluid pump 237 is operating so that the electro-hydraulic units at the front and rear of the automotive vehicle are under pressure and the vehicle body is elevated thereby the simultaneous opening of the valves 131 and 226 of two units on one side or the other of the vehicle body is effected by an inertia switch unit generally designated 261 and shown in the diagrammatic view forming Fig. 18, of a suitable character, preferably of the construction illustrated in Fig. 13 of my prior application hereinbefore referred to. This inertia switch is diagrammatically illustrated in Fig. 18 and comprises a pendulum 262 supported to swing transversely of the vehicle body frame upon the side tilt or side sway of the vehicle body, about the pivot 263. Connected with the pivotal portion of the pendulum are the oppositely extending current conducting contact carrying arms 264, the contact points of which are in spaced relation with fixed contacts 265 when the car or vehicle body is horizontal and the pendulum is vertically suspended. The turning axis for the pendulum is on the longitudinal center of the vehicle body so that upon the swaying of the body to the right or to the left or, in other words, when the vehicle is rounding a curve or not in transversely level state so that one side of the body is elevated above the other, the pendulum 262 will swing transversely of the body to bring a contact carrying arm 264 into electrical connection with an adjacent contact 265.

Means is provided for cutting the inertia switch into and out of operation and when the system is set up so that the switch will distribute electric current to the two units on one side or the other of the vehicle the swaying of the vehicle body to the right will cause the inertia switch to close the circuit to the electro-hydraulic units from the left or high side of the vehicle body to actuate the motors 127 and 223 for the opening of the valves 131 and 226 respectively. This will permit the compressed fluid to escape to the fluid return lines 266 leading back to the reservoir 260 and cause the units to lower, by gravity, the high side of the vehicle body.

Figure 19:
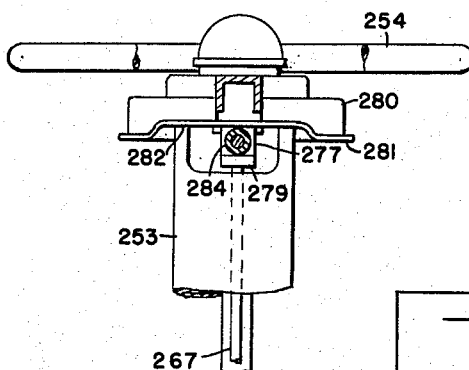
Fig. 19 is a detail section taken substantially on the line 19—19 of Fig. 18.

Figs. 18 and 19 illustrate manual means associated with the vehicle steering directional turn signal mechanism whereby selective actuation of the motors of the pair of units on one side or the other of the vehicle may be accomplished simultaneously with the setting of the signal mechanism for indicating the direction of intended turn.

The electrical system herein disclosed is of the same character as that shown in my prior application but the mechanism associated with the signal operating lever setting and return means is of novel design as will be apparent from the following description.

The numeral 267 designates the turn signal switch operating shaft which passes downwardly through the steering shaft housing or tube 253 to the turn signal switch mechanism which is diagrammatically shown and generally designated 268. This shaft is continued for central connection with a two arm switch 269 which has one arm permanently in electrical contact with a current pick-up plate 270 which receives the electric current from the vehicle battery 271 while the other arm is adapted for selective electrical engagement with a center contact 272 which is electrically connected with the pendulum actuated contact arms 264 or with one or the other of two lateral contacts 273 each of which is electrically connected with a pair of electro-hydraulic body elevating units on one side of the vehicle. This system and its operation have been fully illustrated and described in my prior application and it is not believed that further description of the layout or its operation is here required.

The upper end of the steering shaft housing or tube 253 supports a stationary bearing member 274 with which the upper end of the shaft 267 is rotatably connected and pivotally attached to the upper end of the shaft 267 as at 275 is the inner end of a hand lever 276. This hand lever is adapted to swing vertically on the pivot 275 and adjacent to its inner end it carries the depending finger 277 between the lower end of which and the adjacent top part of a shaft 267 is a coil spring 278 which constantly urges the upward swinging of the outer end of the hand lever but such upward swinging movement is limited by the limit stop 279 also secured to and supported by the upper end of the shaft 267.

Secured to the underside of the steersman operated steering wheel 254 to turn therewith and concentric with the steering wheel is an annular control cam 280. This control cam has the lower edge surface provided, upon the left hand side of the steering wheel, with the cam track surface 281 which is formed with the relatively long off-set or indenture 282, the transverse center of which is directly below the usual location of left hand cross spoke of the steering wheel when this wheel is in position for straight ahead steering.

At the ends of the long indenture 282 are the shallow kick-back indentures 283, the function of which will be hereinafter described.

Figure 21:
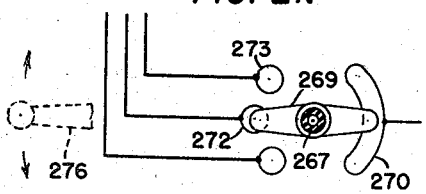
Fig. 21 is a diagram of the manually controlled switch.

When the hand lever 276 is in the off directional steering indication position the turn signal switch will, of course, be off and the switch arms 269 will be in the position shown in Fig. 21 where the contact plate 270 is electrically connected with the center contact 272 which is in turn electrically connected with the movable contact carrying arms of the inertia switch. Under this condition the inertia switch is free to effect the energization of the valve operating motors of the pairs of units 26, 27 at the sides of the vehicle.

The intermediate portion of the hand lever 276 has mounted thereon the slidable rubber friction sleeve 284 which enters the long indenture 282 and is out of contact with the cam track 281 when the lever 276 is normally stationary.

The depth of indenture 282 is such that when the rubber friction sleeve is in its inner position it will be out of contact with the bottom or cam surface of the indenture. It is held in this position by the stop finger 277 which by contact with the part 279 limits the upward movement of the lever 276.

When the slide friction sleeve is in its inward position, to actuate the directional signal lever, the action is as follows.

Steering wheel turning movement to the extent of 30° from each side of zero position is allowed, as illustrated by Fig. 25, during which turning movement the automatic electric distributor 261, controls the transverse level state of the car body. However, when the steering wheel is moved, or turned, right or left, more than 30°, then an inclined face 282a of the cam track, "butts" or kicks the signal lever to signalling position, and at the same time cuts out the automatic distributor circuit and actuates the switch blade 269 to effect energization of a pair of electrohydraulic units on one side of the vehicle.

After the steering wheel has been turned in one direction beyond a kick-back indenture and is then reversely turned, the friction between the cam track and the rubber friction sleeve will urge the return of the lever to zero position but if such friction should be insufficient, the engagement of the sleeve in a kick-back indenture provides an additional means of reversely moving the lever.

In the structure described, regard being had particularly to the front end mechanism provision is made for a required functional range of relative movement between the automotive vehicle body and the steerable wheels of the running gear, the spindle bolts for the steerable running gear wheels being provided with the hydro-electric units to resiliently support the vehicle body on the turning axis of the wheels whereby to cause the camber axis of the steerable running gear wheels to be held in a constant desired relation to the vehicle body incident to any point of travel in the range of the said relative movement. This desired functional range of relative movement between the vehicle body and the steerable wheels is provided for or made possible by the parallelogram frame structures consisting each of upper and lower horizontally positioned and parallel tractor arms, the forward and rear ends of which arms are pivotally connected to turn on transverse horizontal axes perpendicular to or having a 90° relationship to the center line of the vehicle body.

The eccentric adjustment means shown in Figs. 14 and 15 at the rear end of each of the wheel tractor arms provides for the quick and easy adjustment of camber or caster inclination of the steerable wheels and by the novel formation of the wheel tractor arms allowance is made for full range of right or left steering movement without interference between the sides of the arms and the adjacent wheel tires.

The horizontal pivot coupling between the forward end of each of the tractor arms and the adjacent end of the transverse frame member 32 provides for the full range of vertical swing of the adjacent or attached steering wheels with the constant maintenance of the parallel relationship between adjacent tractor arms.

The steering motion is transmitted to the steerable front wheels from the manual steering wheel through a drag link and tie rods, which tie rods are operatively coupled together for unitary movement by the novel steering bar 43 supported midway between its ends at the center of the transverse frame 32 and by reason of the novel universal joint coupling between the tie rods and the steering bar the desired parallel relation is maintained between the tie rods and the adjacent tractor arms.

In the present invention provision is made whereby the operator of the vehicle may maintain the vehicle body elevated with respect to the chassis frame by means of the front and rear hydro-electric units or permit the body to be lowered to normal position where it will be resiliently supported only by the springs in each of the units in question.

The means whereby the raising or lowering of the vehicle body in level condition is illustrated particularly in Fig. 22.

As hereinbefore described the pump shaft 241 has supported thereon the pulley 242 which pulley includes the hub 243 on the outer end of which are formed the clutch teeth 244. The pulley and hub are free to rotate on the shaft 241.

Outwardly from the toothed end of the pulley hub the shaft has mounted thereon the clutch collar 245 having the encircling shift fork groove 246 therein. The inner end of the collar, which is opposed to the teeth 244, has the teeth 247, formed for interengagement with the teeth 244.

The collar is splined on the shaft 241 for sliding non-rotative movement thereon whereby when moved toward the pulley hub the teeth 247 will mesh with the teeth 244 and driving motion will be transmitted to the pump shaft from the pulley.

The pump is supported by a suitable base 248 and adjacent thereto is a clutch fork supporting bracket 249 on which is pivoted for rocking motion the fork 250 carrying the arms 251.

The steering shaft tube 253 has supported thereon a suitable housing 252 in which is pivotally mounted a control lever 255 which extends therefrom through an opening 256 in a convenient position for engagement by a hand of the vehicle operator.

This lever may be provided with suitable oppositely extending arms 257 and to each of these is attached an end of one of two actuating cables 258. The other end of each of these cables is attached to a shift fork arm 251 as illustrated.

Movement of the lever 255 from the off to on position will engage the shiftable collar with the constantly rotating pulley hub to actuate the pump. When this connection is established fluid will be forced under pressure into the chamber 113 of each of the front units and into the hydraulic cylinder 188 of each of the rear units.

The position of the pistons 117 for the front units, shown in Fig. 5, and the position for the piston 200 for the rear units, shown in Fig. 7, is that assumed when the hydraulic pump is not operating or, in other words, when there is no fluid pressure in the units. Under such conditions the front and rear suspension for the vehicle body is carried entirely by the springs 109 and 199. This normal or non-elevated position for the rear units is also shown in Figs. 6 and 8.

When the fluid in the system is under pressure, that is, when the hydraulic pump 237 is being operated the pistons 117 and 200 of the front and rear units respectively will be subjected to pressure and will be forced outwardly with respect to the enclosing cylinders 110 and 188 respectively to raise the vehicle body above its normal or conventional elevation with respect to the chassis frame. When the vehicle body is elevated in the manner stated, the flanged support roller 180 will be located approximately in the zone C, see Fig. 8, where the roller is shown in this position in dotted outline. When the roller carrier arm 164 is oscillated to position the roller in this last mentioned location with respect to the cam track the desired elevation of the car body is brought about. The side faces of the cam bar, engaged by the flanges of the body support rollers during relative movement between the car body and the rear axle, constantly hold the body frame center line in proper relation with the center line of the running gear or chassis.

By the provision of the adjustment bolt 161 the angular relation of the cam faces A, B, and C to the vertical may be changed or adjusted as may be found desirable.

The adjustment bolt 149 provides means for making adjustments in the position of the hydraulic unit and for changing the spring pressure. By the provision of the bifurcated upper end of the bracing arms a rigid anchor is provided for the end of the unit which not only stabilizes it against longitudinal movement but also against movement in a lateral direction.

As hereinbefore stated the cam track has at a predetermined location thereon a marker B'. This marker is provided for setting the initial location of the roller 180, the rollers being initially brought to position opposite this marker by means of the adjustment bolt 161. When the rollers of the two units 27 are each in position opposite the marker B' the vehicle body will be disposed in a transversely level state. Such positioning is, of course, accomplished during the time that the fluid circulating motor 237 is idle or, in other words, the hydro-electric units are not under fluid pressure.

During such time as the hydraulic motor is operating so that the front and rear hydro-electric units are under fluid pressure, if the vehicle body is in a transversely level state the contact points 264 and 265 of the automatic control circuit will be separated but, if, due to an unbalancing of the vehicle body as, for example, by applying a heavy load on one side, the pendulum 262 is caused to swing, the contacts 264, 265 on the side of the vehicle toward which the pendulum swings, will be brought together and the magnetically actuated valves for the front and rear units 26 and 27 on the opposite side of the vehicle will be moved to open position so that fluid in the cylinder of the front unit will be permitted to escape back into the system through the chamber 114 and in the rear unit 27 the fluid will be permitted to escape back into the system from the chamber C" by way of the port 212 so that that side of the vehicle body will be lowered, and thus brought back to a transversely level condition.

I claim:

1. In a motor vehicle, a chassis frame, rear wheel running gear, yieldable suspension means connecting the frame with said running gear, the chassis frame including side beams and a transverse front beam extending at its ends laterally of the side beams, steerable front wheel running gear including knuckle bolts, rearwardly extending pairs of vertically spaced duplicate parallel arms, each pair having forward ends pivotally connected one above the other to one of said ends of the transverse beam for vertical swinging movement, said arms lying outside the area of the side beams and in substantially parallel relation therewith, means pivotally coupling the rear ends of each pair of the arms to the top and bottom ends of a kunckle bolt whereby each wheel has up-and-down movement and steering turning movement, said pivot couplings at the forward and rear ends of the arms being in substantial alignment longitudinally of the chassis, means for steering the steerable wheels, and an elongate resilient suspension means mounted directly upon the top end of and supported by each knuckle bolt between the bolt and the adjacent frame side beam.

2. The invention according to claim 1, wherein said duplicate arms are inwardly bowed from the pivoted ends through a substantial portion of their length providing a clearance permitting inward swinging of the forward part of the adjacent steerable wheel beyond the longitudinal centers of the rear end portions thereof.

3. In a motor vehicle, a chassis frame embodying longitudinal side beams and a transverse front end beam connecting the side beams, rear wheel running gear, yieldable suspension means connecting the frame with the running gear, steerable front wheels, a pair of vertically spaced tractor arms extending rearwardly from each end of said front end beam, transverse pivot means coupling the forward ends of said arms with the front beam for vertical swinging, steerable front wheels, means coupling each steerable front wheel with the rear ends of a pair of arms for vertical movement with the attached ends of the arms and for steering turning movement, means for steering the steerable means, resilient suspension means between each steerable wheel and the adjacent frame side beam, and means forming a part of the coupling means between the arms and the steerable wheels for adjusting the caster and camber of the wheels, said coupling means comprising a spindle bolt secured to a part of the steerable wheel, sleeves encircling the spindle bolt at the ends thereof and having the bolt rotatably mounted therein, and a pivot coupling between the sleeves at the upper and lower ends of the bolt and the means for adjusting the wheel caster and camber at the rear ends respectively of the upper and lower arms.

4. In a motor vehicle, a chassis frame embodying side beams and a transverse front beam having end portions extending laterally beyond the side beams, rear wheel running gear, suspension means between the running gear and the frame, a pair of vertically spaced tractor arms extending in parallel relation rearwardly from each laterally extending portion of said front beam, a horizontal transversely directed pivot coupling the front end of each arm with the said laterally extending portion of the transverse beam, said arms and horizontal pivots lying outside the area of the side beams and the arms being in substantially parallel relation with the side beams, an arbor supported by the rear end of each arm for turning on an axis directed transversely of the frame, a spindle bolt pivotally connected adjacent to each end with and coupling together adjacent upper and lower arbors, said spindle bolt pivots lying substantially in line with respective horizontal transversely directed pivots in the longitudinal direction of the frame, steerable front wheels, a coupling between each front wheel and a spindle bolt, means for imparting steering motion to said front wheels, and elongate resilient suspension means mounted upon the top of and aligned with each spindle bolt between the frame and the bolt.

5. In a motor vehicle, a chassis frame embodying side beams and a transverse front beam having end portions extending laterally beyond the side beams, rear wheel running gear, suspension means between the running gear and the frame, a pair of vertically spaced tractor arms extending in parallel relation rearwardly from each laterally extended portion of said front beam, a horizontal transversely directed pivot coupling the front end of each arm with the said laterally extended portion of the transverse beam, an arbor supported by the rear end of each arm for turning on an axis directed transversely of the frame, a spindle bolt pivotally connected adjacent to each end with and coupling together adjacent upper and lower arbors, steerable front wheels, a coupling between each front wheel and a spindle bolt, means for imparting steering motion to said front wheels, elongate resilient suspension means mounted upon the top of and aligned with each spindle bolt between the frame and the bolt, and means between each arbor and the supporting arm therefor for adjusting the steerable wheel caster and camber.

6. In a motor vehicle, a chassis frame embodying side beams and a transverse front beam having end portions extending laterally beyond the side beams, rear wheel running gear, suspension means between the running gear and the frame, a pair of vertically spaced tractor arms extending in parallel relation rearwardly from each laterally extending portion of said front beam, a horizontal transversely directed pivot coupling the front end of each arm with the said laterally extending portion of the transverse beam, a split collar upon the rear end of each arm, a bearing in each collar, an arbor mounted in each bearing for turning on an axis directed transversely of the arm, a substantially vertical sleeve pivotally attached to an end of each arbor to turn on a horizontal axis perpendicular to the arbor axis, a spindle bolt having upper and lower ends each engaged in one of said sleeves to turn therein, steerable front wheels, means securing each spindle bolt to a front wheel, means for imparting steering motion to the front wheels, and suspension means between each front wheel and the chassis frame.

7. The invention according to claim 5, with means for shifting the arbor bearing axially and means for shifting the position of the arbor in a direction transversely of the arm.

8. Means for mounting a steerable wheel on a motor vehicle chassis frame, comprising a steering spindle bolt, means for securing the same to a non-rotating part of the steerable wheel structure, a short sleeve upon each end of said spindle bolt and in which the spindle bolt end turns, an arbor connected to each short sleeve and extending laterally therefrom, said arbors being substantially parallel, a bearing encircling each arbor, supporting means for said bearings, and means operatively coupling said bearing supporting means with the chassis frame.

9. The invention according to claim 8, with means for shifting the arbor axially for camber adjustment and means for shifting the arbor in a direction perpendicular to the axis thereof for caster adjustment.

10. In a motor vehicle, a chassis frame embodying side beams and a transverse front beam having end portions lying outwardly of the side beams, rear wheel running gear, suspension means coupling the chassis and said running gear, a pair of vertically spaced tractor arms extending rearwardly from each outer end portion of said front beam, each of said arms having a transverse bearing at its forward end, a pivot bolt carried horizontally by each outer end portion of said front beam at the forward end of each arm and passing through the adjacent arm bearing, steerable front wheels, front suspension means between the frame and front wheels, means pivotally coupling each steerable front wheel with the rear ends of a pair of tractor arms for up-and-down movement with the attached ends of the arms and for steering turning movement, a steering knuckle arm connected to each front wheel, tie rods connected to said steering knuckle arms and extending forwardly on the outer sides of the chassis frame each between the adjacent pair of arms, drag link means for imparting steering movement to one of said tie rods, and means carried by said transverse front beam and operatively connected to the tie rods for moving the latter in coordination.

11. The invention according to claim 10, wherein said last means comprises an elongate steering bar disposed transversely of the front end of the chassis frame, a pivot means connecting said bar at its transverse center to the transverse beam for rocking motion on a vertical axis lying in the longitudinal center of the chassis and each tie rod being connected to an end portion of the steering bar.

12. In a motor vehicle, a chassis frame embodying side beams and a transverse front beam, rear wheel running gear, suspension means coupling the chassis with said running gear, said front beam having end portions extending laterally beyond the side beams, a pair of vertically spaced tractor arms positioned to extend rearwardly from each extended end portion of the transverse beam, pivot means between the forward ends of the arms of each pair and the said extended end portions of the transverse beam permitting vertical swinging of the arms, steerable front wheels, suspension means between the frame and said front wheels, means coupling each front wheel with the rear ends of a pair of arms for up-and-down movement and for steering turning movement, said transverse front beam being formed between the side beams with a bowed center portion, a vertical pivot member carried by said bowed portion in the longitudinal center line of the chassis frame, a steering bar paralleling the front beam and supported centrally of its ends upon said vertical pivot member and having outer end portions lying outside of the side beams, tie rod connections between the said outer end portions of said steering bar and the adjacent front wheels, said tie rod connections each including a tie rod and a universal coupling between an end thereof and the steering bar, and means for imparting steering motion to the steerable wheels.

13. The invention according to claim 12, with means connecting the universal coupling with the steering bar for adjusting the position of the coupling in a direction transversely of and relative to the bar.

14. The invention according to claim 12, wherein said universal coupling comprises an element having a threaded stem, an internally and externally threaded sleeve having said stem threaded therein, and a nut secured to the steering bar in line with a transverse opening therein, and said sleeve being threaded through said nut.

15. In a motor vehicle, a chassis frame embodying side beams and a transverse front end beam, said front end beam comprising a vertical central plate having oppositely extending top and bottom arms connected at their outer ends by vertical webs, said front end beam being of a length to have the web connected ends extending laterally beyond the chassis side beams, each of said chassis side beams having an inset front end portion of bifurcated form each spanning the space between and being secured to two adjacent top and bottom arms, a pair of vertically spaced tractor arms extending rearwardly from each end portion of the front end beam, means pivotally coupling the forward ends of the upper and lower tractor arms of each pair respectively to the adjacent upper and lower beam arms for vertical swinging, steerable front wheels, means coupling each front wheel with the rear ends of a pair of tractor arms for up-and-down movement and for steering turning movement, a vertical pivot member carried by said central plate in the longitudinal center line of the chassis frame, a steering bar mounted centrally of its ends upon said pivot member and having its ends each extending laterally beyond a side beam of the chassis and lying in the space between upper and lower arms of the front end beam, tie rod connections between the outer end portions of said steering bar and the adjacent front wheels, means for imparting steering motion to said wheels, rear wheel running gear, yieldable suspension means between the chassis frame and said rear wheel running gear, yieldable suspension means between the chassis frame and the front wheels, and said tractor arms being inbowed toward and spaced from the adjacent inset front end portion of the chassis beam to provide clearance for steering movement of the front wheels.

16. The invention according to claim 15, with an upstanding bracket upon each side beam of the chassis adjacent to each front wheel and inclined outwardly and having the second mentioned suspension means connected with the top part thereof.

17. In a motor vehicle, a chassis frame embodying side beams and front and rear cross beams, steerable front wheels, means operatively coupling said wheels with said front beam for up-and-down swinging on two superposed parallel and transversely directed axle elements carried by the front cross beam and disposed entirely laterally of the outer sides of the adjacent side beams, means whereby turning steering movements may be imparted to said wheels, said last means including a spindle bolt secured to a part of the wheel, an upstanding bracket mounted upon each side beam adjacent to each front wheel and having an outwardly extending part overlying the adjacent spindle bolt, yieldable suspension means interposed between and connected with said outwardly extending part of each bracket and the top end of the underlying spindle bolt and supported on the spindle bolt, rear wheel running gear, and a yieldable suspension means operatively connecting each side beam of the chassis frame with the rear wheel running gear.

18. The invention according to claim 17, wherein the first mentioned suspension means includes an upright coil spring and a fluid pressure operated extensible unit between the top of the spring and the said part of the bracket, each of the second mentioned suspension means comprising a substantially horizontally disposed coil spring, rigidly supported abutment means between one end of the latter spring and the adjacent frame beam, a horizontally movable element engaging the other end of the latter spring, a camming coupling between said horizontally movable element and underlying running gear whereby compression and expansion of said latter spring occurs upon relative up-and-down movement between the chassis and rear wheel running gear, a fluid pressure operated extensible unit for applying compression thrust against the end of the latter spring remote from the camming coupling, means for introducing fluid under pressure into the units to effect extension of the same, and means for releasing the pressure simultaneously in front and rear units on one side of the chassis while maintaining pressure in the front and rear units upon the opposite side.

19. In a motor vehicle, a chassis frame embodying side beams, steerable front wheel running gear, means for steering said front wheel gear, said front wheel running gear including steering knuckle-spindle bolts on the axis of which the front wheels turn in steering, an upstanding suspension bracket adjacent each front wheel, an elongate upright suspension structure between each bracket and the top of the adjacent spindle bolt, said structure including a coil spring, rear wheel running gear including a rear axle housing, an upright support arm adjacent to each side beam and mounted on the axle housing for fore-and-aft rocking movement, an elongate horizontally disposed suspension structure adjacent to and extending longitudinally of each side beam and including a coil spring, an operative coupling between one end of the latter spring and the top end of the adjacent support arm, a rigid thrust support for the other end of the latter spring between the same and the chassis beam, an inclined cam supported on each beam on the side of the support arm remote from the spring and disposed at an inclination across the top end of the arm, and a follower carried by each arm in moving contact with the adjacent cam.

20. The invention according to claim 19, with means for changing the angle of inclination of each of said cams.

21. The invention according to claim 19, with means for changing the position of said thrust support whereby to adjust the compression of the second mentioned spring.

22. The invention according to claim 19, with a hydraulic unit forming a part of each suspension structure for increasing compression thrust upon the coil spring whereby to effect additional elevation of the chassis frame above the normal spring supported elevation with respect to the running gear, means for supplying fluid under pressure simultaneously to said units, said units being coupled to the supply means in pairs, each pair consisting of a front and rear unit, and means for selectively releasing the fluid pressure in the pairs of units.

23. In a motor vehicle, a chassis frame embodying side beams, front end running gear including steerable wheels, means for imparting steering movement to said wheels, front end suspension means between the side beams and said wheels, rear end running gear including a rear axle housing, and rear end suspension mechanism between each side beam and the axle housing, each mechanism comprising an upright support arm mounted on the housing for rocking movement in a plane parallel with the side beams, an upright bracing arm mounted on the adjacent beam adjacent to the support arm, an elongate cam bar positioned adjacent to the support arm on the opposite side thereof from the bracing arm and having a cam track facing the support arm, means connecting the cam bar to the beam whereby the cam track is disposed at an inclination to and across the top end of the support arm, a follower carried by the support arm in engagement with the cam track, a pair of elongate telescopically coupled component units substantially horizontally disposed between and operatively connected at their remote ends to the support arm and the bracing arm, a coil spring encircling said coupled units, and opposed elements fixed each to one of said coupled units and having the spring confined under compression therebetween.

24. The invention according to claim 23, wherein the means connecting the cam bar to the beam is a pivot means at the top end of the bar facilitating swinging of the cam bar relative to and in the vertical plane of the support arm, and an adjustable coupling between the lower end of the cam bar and the beam for adjusting the angle of inclination of the cam bar relative to the vertical setting of the support arm.

25. The invention according to claim 23, wherein the means connecting the cam bar to the beam is a pivot means at the top end of the bar facilitating swinging of the cam bar relative to and in the vertical plane of the support arm, and an adjustable coupling between the lower end of the cam bar and the beam for adjusting the angle of inclination of the cam bar relative to the vertical setting of the support arm, and said follower comprises a roller engaging the cam track and having opposite end flanges between which the cam track is confined.

26. The invention according to claim 23, wherein the connection between the said remote end of one of the telescopically coupled component units and the bracing arm comprises a bifurcation of the upper end of the arm in which the said end of the one unit is positioned and bearing cradles carried on opposite sides of the said end of said one unit in which the ends of the furcations seat, said bracing arm mounting being pivotal, and adjusting means connecting the lower end of the bracing arm with the beam for turning the bracing arm on its pivot.

27. The invention according to claim 23, wherein the said one of the telescopically coupled component units with which the said bracing arm is connected comprises a hydraulic cylinder part and a hollow piston part, said cylinder part carrying one of said opposed elements and said piston part being connected with the bracing arm, means for introducing fluid under pressure into the cylinder part, means for exhausting the fluid from the cylinder part through the hollow piston part, and valve means for controlling the said exhausting of the fluid.

28. The invention according to claim 27, with a cylindrical bellows enclosing the coil spring and secured at one end to the one of said opposed elements carried by that one of the telescopically coupled members which is connected to the support arm, the other end of said bellows encircling and being secured to the said piston part.

29. The invention according to claim 23, wherein the said one of the telescopically coupled component units with which the said bracing arm is connected comprises a hydraulic cylinder part and a hollow piston part, the hydraulic cylinder part being slidable in the other component unit and the piston part having an enlarged outer end portion to which the bracing arm is connected, a partitioning means in said outer end portion dividing the hydraulic piston part into an outer chamber and an inner chamber, the inner chamber opening into the cylinder part, means for introducing pressurized fluid into the inner chamber for flow through the piston part into the cylinder part, a fluid lead-off for said outer chamber, and valve means controlling passage of pressurized fluid from the inner chamber to the outer chamber.

30. The invention according to claim 29, with magnetic means for effecting actuation of said valve means.

31. The invention according to claim 29, with means for effecting the escape of the pressurized fluid from the cylinder part into said outer chamber upon a predetermined extent of outward movement of the piston part.

32. The invention according to claim 23, wherein the said one of the telescopically coupled component units with which the said bracing arm is connected comprises a hydraulic cylinder part and a hollow piston part, the hydraulic cylinder part being slidable in the other component unit and the piston part having an enlarged outer end portion to which the bracing arm is connected, a partitioning means in said outer end portion dividing the hydraulic piston part into an outer chamber and an inner chamber, the inner chamber opening into the cylinder part, means for introducing pressurized fluid into the inner chamber for flow through the piston part into the cylinder part, a fluid lead-off for said outer chamber, a tube connected to and opening at one end through the partitioning means into the outer chamber and lying in the inner chamber, means closing the inner end of the tube, said tube having a wall port, a reciprocable valve tube having an open end slidably disposed in the first tube and closing said port and extending at its other end into and opening into the outer chamber, and an electrical actuator connected with the valve tube and when energized axially shifting the latter to a position to uncover said port to permit pressurized fluid to pass into the outer chamber.

33. The invention according to claim 32, wherein the means closing the inner end of the first tube comprises an elongate plunger valve stem secured at one end to the inner end of the cylinder part and extending a substantial distance into said first tube, said piston and first tube being movable relative to the valve stem, and means whereby said first tube will be put in communication with the hollow piston part and cylinder part to exhaust pressurized fluid into the outer chamber upon a predetermined extent of outward movement of the piston.

34. In a motor vehicle including a chassis frame, front running gear including steerable wheels and rear running gear, a power plant, and means for imparting steering motion to said steerable wheels including a hand steering wheel, a suspension means between each steerable wheel and the chassis frame, a suspension means between each side of the chassis frame and the rear running gear, each said suspension means embodying hydraulic lift mechanism which when under hydraulic pressure elevates the chassis to a transversely level condition above the running gear, the front and rear suspension means on each side of the chassis forming a cooperating pair, pump means which when operating supplies fluid under pressure equally to the lift mechanisms of the two pairs of suspension means, means for effecting reduction of fluid pressure simultaneously in the mechanisms of either pair of suspension means, shiftable means for effecting a driving connection between said pump and the vehicle power plant, and means controllable from said hand steering wheel for actuating said shiftable means to and from said driving connection.

35. The invention according to claim 34, wherein said shiftable means embodies a clutch and a free rotating constantly driven member, and means controllable from the hand steering wheel including a hand lever and flexible cables for selectively shifting the clutch.

36. The invention according to claim 34, wherein the said means for effecting reduction of fluid pressure in the mechanisms of either pair embodies a pivoted hand lever supported beneath the hand steering wheel, a shiftable element on said lever, and means carried by the hand steering wheel for coaction with said shiftable element when the latter is in one position on the lever for effecting the said reduction of fluid pressure in the mechanisms of one pair of suspension means upon rotation of the hand steering wheel to a predetermined extent in one direction.

37. In a motor vehicle having a conventional rotatable electric turn signal control shaft, a steering wheel, a body supporting chassis frame and running gear therefor, suspension means between said frame and gear including a pair of fluid pressure actuated units on each side of the vehicle for elevating the frame with respect to the running gear, means for supplying fluid under pressure to said pairs of pressure actuated units, electrically operated pressure release means for said pressure actuated units, inertia operated means whereby the electrically operated pressure release means is energized for a pair of fluid pressure actuated units upon the tilting of the vehicle body from a transversely horizontal condition, means connected with said turn signal control shaft for manually cutting out said inertia operated means and energizing a predetermined pair of fluid pressure actuated units, a lever connected with said shaft for manually turning the shaft to a predetermined set signaling position, and cooperatively acting means between the steering wheel and said lever by which the steering wheel and lever are coupled upon the turning of the wheel to a predetermined degree after turning the shaft to said set position whereby the steering wheel imparts turning movement to the lever and shaft.

38. In a motor vehicle, in combination, a chassis, rear end supporting wheels, steerable front wheels, resilient suspension elements between said wheels and chassis, mechanism for elevating the chassis on said resilient elements and for maintaining said elevation, a steering wheel and steering post, a turn signal control shaft rotatably supported adjacent to said post and turn signal switch operated thereby, a second switch, means for effecting the opening and closing operation of the second switch by the turning of said shaft comprising a lever pivotally connected with said shaft adjacent to the the underside of the steering wheel and extending radially thereof, the lever facilitating turning of the shaft and being pivotally movable toward and away from the wheel, a circular cam track concentric with the steering post and connected with the shaft to turn therewith, means whereby after a predetermined degree of turning of the wheel and cam track engagement will be effected between the cam track and lever to move the latter in a direction to impart turning movement to the shaft, and means associated with said elevating mechanism and actuated by said second switch upon a predetermined turning movement of said shaft to cause said elevating mechanism to permit lowering of one side of the chassis to prevent during turning of the front wheels alteration of wheel camber from the normal straight ahead camber setting of the wheels.

39. In a motor vehicle, in combination, a chassis, rear end supporting wheels, steerable front wheels, resilient suspension elements between said wheels and chassis, mechanism for elevating the chassis on said resilient elements and for maintaining said elevation, a steering wheel and steering post, a turn signal control shaft rotatably supported adjacent to said post and turn signal switch operated thereby, a second switch, means for effecting the opening and closing operation of the second switch by the turning of said shaft comprising a lever pivotally connected with said shaft adjacent to the underside of the steering wheel and extending radially thereof, the lever facilitating turning of the shaft and being pivotally movable toward and away from the wheel, a circular cam track concentric with the steering post and connected with the shaft to turn therewith, said lever having a neutral position in which the turn signal is inoperative and the second switch maintains a predetermined setting, the cam track having a recessed area of predetermined degree in the center of which area said lever is positioned when the steering wheel is set for straight ahead steering, said cam track being formed at each end of said area for engagement with the lever after a predetermined degree of turning of the wheel and cam track to effect turning movement of the lever and shaft therewith, and means associated with said elevating mechanism and actuated by said second switch upon a predetermined turning movement of said shaft to cause said elevating mechanism to permit lowering of one side of the chassis to prevent during turning of the front wheels alteration of wheel camber from the normal straight ahead camber setting of the wheels.

40. The invention according to claim 39, wherein said lever embodies a shiftable element movable longitudinally thereof with which the said cam track engages at the ends of said recessed area when the element is in one position, said element being movable to another position where connection between the cam track and the lever does not occur in the turning of the wheel and cam track.

41. The invention according to claim 38, wherein said pivot connection of the lever with said shaft includes coacting elements carried by the lever and shaft and limiting upward swinging of the lever to approximately a right angular relation with the shaft and spring means yieldingly holding the lever in said relation with the shaft.

42. In a motor vehicle, a body supporting chassis, running gear beneath the same including steerable front wheels and rear wheels, a suspension unit forming the sole coupling between the chassis and each of the wheels of the running gear, each unit including a spring suspension means and an extensible fluid pressure operated unit coupled to and mechanically interposed between the spring suspension means and the chassis, said pressure operated units when pressurized elevating the chassis and body on the springs, a fluid system having said pressure units connected therein, a fluid pump in said system which is adapted when operating to introduce fluid into and place said units under pressure, means for driving said pump, means for operatively coupling and uncoupling the pump and said means for driving the same, and remote control means for selectively operating said coupling and uncoupling means.

43. The invention according to claim 42, wherein said remote control means comprises a hand lever movably supported adjacent to the underside of the motor vehicle steering wheel and having an "on" and an "off" position, and actuating cables operatively connecting the hand lever with said means for operatively coupling and uncoupling the pump and the said means for driving the same.

44. The invention according to claim 42, wherein the said means for driving the pump and operatively coupling and uncoupling the means and the pump comprises a driving connection between the vehicle motor and a free running rotary driven element, clutching mechanism for operatively coupling said driven element and the pump, and said remote control means comprises a hand lever, a clutch shifter and an operating cable between the hand lever and the clutch shifter.

45. In a motor vehicle, a chassis frame embodying side beams, front end running gear including steerable wheels, rear end running gear including a transverse rear axle housing, front end suspension means between the chassis frame beams and the steerable wheels, and rear end suspension mechanism between each side beam and the axle housing, each mechanism comprising an upright support arm, a bearing mounting between the lower end of the arm and the axle housing for the rocking movement of the arm in a plane parallel with the side beam, bracing means on the beam in spaced relation with the support arm, an elongate cam bar mounted on the beam adjacent to the side of the support arm remote from the bracing means and having a longitudinal cam track face in opposed relation to the arm and the cam track face disposed at an inclination to form an acute angle with the upper end of the arm, a follower carried by the support arm and engaging said track face, a pair of elongate telescopically coupled component units substantially horizontally disposed between and operatively connected at their remote ends to the support arm and the bracing means, a coil spring encircling said coupled units, opposed elements fixed each to one of the coupled units and having the spring confined under compression therebetween, means for extending by fluid pressure the unit connected to the support arm to ride said follower on the cam track whereby to effect vertical movement of the chassis frame beam relative to the axle housing, said cam track face having joined zones of contour defining changes in spring rate, a point of joinder between two zones constituting a neutral location position for the follower for normal spring rate when the said fluid pressure means is inoperative.

46. The invention according to claim 45, in combination with a tail light housing mounted on a rear fender of the vehicle body, an expansible bellows sleeve encasing the spring and secured to and closed at its ends by said opposed elements, a breather tube connected at one end to and opening in the bellows, a nipple connected to and opening into said tail light housing, said tube being connected at its other end to said nipple, and an air inlet and exhaust port for said tail light housing.

47. In a motor vehicle, a chassis frame embodying side beams and front and rear cross beams, steerable front wheels, means operatively coupling said wheels with said front beam for up-and-down swinging on two superposed parallel and transversely directed axle elements carried by the front cross beam and disposed entirely laterally of the outer sides of the adjacent side beams, means whereby turning steering movements may be imparted to said wheels, said last means including a spindle bolt secured to a part of the wheel, an upstanding bracket mounted upon each side beam adjacent to each front wheel and having an outwardly extending part overlying the adjacent spindle bolt, yieldable suspension means interposed between and connected with said outwardly extending part of each bracket and the top end of the underlying spindle bolt and supported on the spindle bolt, rear wheel running gear, and a yieldable suspension means operatively connecting each side beam of the chassis frame with the rear wheel running gear, said first mentioned suspension means including an upright coil spring and a fluid pressure operated extensible unit supported upon the top of the spring and interposed between the said part of the bracket, the bottom end of the spring only of the suspension means being coupled with the adjacent spindle bolt, means for introducing fluid under pressure into the said extensible units to effect extension of the same to elevate the chassis on the spindle bolts, and means for releasing the pressure in said extensible units selectively on either side of the chassis while maintaining pressure in the unit upon the opposite side.

References Cited in the file of this patent

UNITED STATES PATENTS

| | | |
|---|---|---|
| 1,251,399 | Mayer | Dec. 25, 1917 |
| 1,271,978 | Wood | July 9, 1918 |
| 1,650,680 | Youse | Nov. 29, 1927 |
| 2,098,473 | Thompson | Nov. 9, 1937 |
| 2,164,470 | Opolo | July 4, 1939 |
| 2,202,665 | Metz | May 28, 1940 |
| 2,290,923 | Wahlberg | July 28, 1942 |
| 2,428,447 | Bolley | Oct. 7, 1947 |
| 2,490,719 | Tank | Dec. 6, 1949 |
| 2,605,118 | Booth | July 29, 1952 |
| 2,687,311 | Nallinger | Aug. 24, 1954 |
| 2,720,403 | Martin | Oct. 11, 1955 |
| 2,728,583 | Tucker | Dec. 27, 1955 |
| 2,756,067 | Porsche | July 24, 1956 |